(12) United States Patent
Mollicone et al.

(10) Patent No.: US 7,581,177 B1
(45) Date of Patent: Aug. 25, 2009

(54) CONVERSION OF STRUCTURED DOCUMENTS

(75) Inventors: Laurent Mollicone, Kirkland, WA (US);
Andrew P. Begun, Redmond, WA (US);
Ned B. Friend, Seattle, WA (US);
Stephen J. Mooney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 10/632,437

(22) Filed: Aug. 1, 2003

(51) Int. Cl.
*G06F 17/00* (2006.01)
(52) U.S. Cl. ...................... 715/243; 715/248
(58) Field of Classification Search ................. 715/523, 715/248, 243
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendale et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,179,703 A * | 1/1993 | Evans | 717/122 |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |
| 5,218,672 A | 6/1993 | Morgan et al. | |
| 5,222,160 A | 6/1993 | Sakai et al. | |
| 5,228,100 A | 7/1993 | Takeda et al. | |

(Continued)

FOREIGN PATENT DOCUMENTS

EP 0 841 615 A2 5/1998

(Continued)

OTHER PUBLICATIONS

Altova, "User Reference Manual Version 4.4, XML Spy Suite 4.4," Altova Ges.m.g.H & Altova, Inc., May 24, 2002, pp. cover, copyright page, and pp. 55-60, 69-82, 105-109, 150-151, 176, 183-246, 318-336, and 546.*

(Continued)

*Primary Examiner*—Amelia Rutledge

(57) ABSTRACT

An upgrade module is used to convert arbitrary XML documents into a form compatible with the processing expectations of a particular processing mechanism. In one implementation, the upgrade module can be used to convert XML documents pertaining to an earlier version of the processing mechanism to a form compatible with a later version of the processing mechanism. The processing mechanism can pertain to a solution module that transforms an input XML document into an electronic form. The upgrade module can be automatically generated when a user makes changes to the electronic form in a manner that affects the schema of the electronic form, or which affects other aspects of the electronic form. The upgrade module can be implemented as an Extensible Stylesheet Language Transformation (XSLT) file.

22 Claims, 14 Drawing Sheets

U.S. PATENT DOCUMENTS

| | | |
|---|---|---|
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Hefferman et al. |
| 5,381,547 A | 1/1995 | Flug et al. |
| 5,390,325 A | 2/1995 | Miller |
| 5,408,665 A | 4/1995 | Fitzgerald |
| 5,410,646 A | 4/1995 | Tondevold et al. |
| 5,410,688 A | 4/1995 | Williams et al. |
| 5,412,772 A * | 5/1995 | Monson ..................... 715/746 |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |

| | | | | | | |
|---|---|---|---|---|---|---|
| 6,121,965 | A | 9/2000 | Kenney et al. | 6,429,885 B1 | 8/2002 | Saib et al. |
| 6,122,647 | A | 9/2000 | Horowitz et al. | 6,434,563 B1 | 8/2002 | Pasquali et al. |
| 6,144,969 | A | 11/2000 | Inokuchi et al. | 6,434,564 B2 | 8/2002 | Ebert |
| 6,151,624 | A | 11/2000 | Teare et al. | 6,442,563 B1 | 8/2002 | Bacon et al. |
| 6,154,128 | A | 11/2000 | Wookey et al. | 6,442,755 B1 | 8/2002 | Lemmons et al. |
| 6,163,772 | A | 12/2000 | Kramer et al. | 6,446,110 B1 | 9/2002 | Lection et al. |
| 6,167,521 | A | 12/2000 | Smith et al. | 6,457,009 B1 | 9/2002 | Bollay |
| 6,167,523 | A | 12/2000 | Strong | 6,460,058 B2 | 10/2002 | Koppolu et al. |
| 6,182,094 | B1 | 1/2001 | Humpleman et al. | 6,463,419 B1 | 10/2002 | Kluss |
| 6,182,095 | B1 | 1/2001 | Leymaster et al. | 6,470,349 B1 | 10/2002 | Heninger et al. |
| 6,188,401 | B1 | 2/2001 | Peyer | 6,473,800 B1 | 10/2002 | Jerger et al. |
| 6,191,797 | B1 | 2/2001 | Politis | 6,476,828 B1 * | 11/2002 | Burkett et al. ............... 715/760 |
| 6,192,367 | B1 | 2/2001 | Hawley et al. | 6,476,833 B1 | 11/2002 | Moshfeghi |
| 6,195,661 | B1 | 2/2001 | Filepp et al. | 6,477,544 B1 | 11/2002 | Bolosky et al. |
| 6,199,204 | B1 | 3/2001 | Donohue | 6,480,860 B1 | 11/2002 | Monday |
| 6,209,128 | B1 | 3/2001 | Gerard et al. | 6,487,566 B1 * | 11/2002 | Sundaresan .................. 715/513 |
| 6,216,152 | B1 | 4/2001 | Wong et al. | 6,490,601 B1 | 12/2002 | Markus et al. |
| 6,219,698 | B1 | 4/2001 | Iannucci et al. | 6,493,702 B1 | 12/2002 | Adar et al. |
| 6,225,996 | B1 | 5/2001 | Gibb et al. | 6,501,864 B1 | 12/2002 | Eguchi et al. |
| 6,235,027 | B1 | 5/2001 | Herzon | 6,502,101 B1 | 12/2002 | Verprauskus et al. |
| 6,253,366 | B1 | 6/2001 | Mutschler, III | 6,502,103 B1 | 12/2002 | Frey et al. |
| 6,253,374 | B1 | 6/2001 | Dresevic et al. | 6,505,230 B1 | 1/2003 | Mohan et al. |
| 6,263,313 | B1 | 7/2001 | Milsted et al. | 6,505,300 B2 | 1/2003 | Chan et al. |
| 6,266,810 | B1 | 7/2001 | Tanaka et al. | 6,507,856 B1 | 1/2003 | Chen et al. |
| 6,268,852 | B1 | 7/2001 | Lindhorst et al. | 6,516,322 B1 | 2/2003 | Meredith |
| 6,272,506 | B1 | 8/2001 | Bell | 6,519,617 B1 | 2/2003 | Wanderski et al. |
| 6,275,227 | B1 | 8/2001 | DeStefano | RE38,070 E | 4/2003 | Spies et al. |
| 6,275,599 | B1 | 8/2001 | Adler et al. | 6,546,546 B1 | 4/2003 | Van Doorn |
| 6,279,042 | B1 | 8/2001 | Ouchi | 6,549,221 B1 | 4/2003 | Brown et al. |
| 6,281,896 | B1 | 8/2001 | Alimpich et al. | 6,549,878 B1 | 4/2003 | Lowry et al. |
| 6,282,711 | B1 | 8/2001 | Halpern et al. | 6,549,922 B1 | 4/2003 | Srivastava et al. |
| 6,286,033 | B1 | 9/2001 | Kishinsky et al. | 6,553,402 B1 | 4/2003 | Makarios et al. |
| 6,292,897 | B1 | 9/2001 | Gennaro et al. | 6,560,616 B1 | 5/2003 | Garber |
| 6,297,819 | B1 | 10/2001 | Furst | 6,560,620 B1 | 5/2003 | Ching |
| 6,300,948 | B1 | 10/2001 | Geller et al. | 6,560,640 B2 | 5/2003 | Smethers |
| 6,307,955 | B1 | 10/2001 | Zank et al. | 6,563,514 B1 | 5/2003 | Samar |
| 6,308,179 | B1 | 10/2001 | Petersen et al. | 6,571,253 B1 | 5/2003 | Thompson et al. |
| 6,308,273 | B1 | 10/2001 | Goertzel et al. | 6,578,144 B1 | 6/2003 | Gennaro et al. |
| 6,311,271 | B1 | 10/2001 | Gennaro et al. | 6,581,061 B2 | 6/2003 | Graham |
| 6,314,415 | B1 | 11/2001 | Mukherjee | 6,584,469 B1 | 6/2003 | Chiang et al. |
| 6,321,259 | B1 | 11/2001 | Ouellette et al. | 6,584,548 B1 | 6/2003 | Bourne et al. |
| 6,321,334 | B1 | 11/2001 | Jerger et al. | 6,585,778 B1 | 7/2003 | Hind et al. |
| 6,327,628 | B1 | 12/2001 | Anuff et al. | 6,589,290 B1 * | 7/2003 | Maxwell et al. ............. 715/224 |
| 6,331,864 | B1 | 12/2001 | Coco et al. | 6,594,686 B1 | 7/2003 | Edwards et al. |
| 6,342,907 | B1 * | 1/2002 | Petty et al. .................. 715/762 | 6,598,219 B1 | 7/2003 | Lau |
| 6,343,149 | B1 | 1/2002 | Motoiwa | 6,603,489 B1 | 8/2003 | Edlund et al. |
| 6,343,302 | B1 | 1/2002 | Graham | 6,604,099 B1 | 8/2003 | Chung et al. |
| 6,345,256 | B1 | 2/2002 | Milsted et al. | 6,606,606 B2 | 8/2003 | Star |
| 6,345,278 | B1 | 2/2002 | Hitchcock et al. | 6,609,200 B2 | 8/2003 | Anderson et al. |
| 6,345,361 | B1 | 2/2002 | Jerger et al. | 6,611,822 B1 | 8/2003 | Beams et al. |
| 6,347,323 | B1 | 2/2002 | Garber et al. | 6,611,840 B1 | 8/2003 | Baer et al. |
| 6,349,408 | B1 | 2/2002 | Smith | 6,611,843 B1 | 8/2003 | Jacobs |
| 6,351,574 | B1 | 2/2002 | Yair et al. | 6,613,098 B1 | 9/2003 | Sorge et al. |
| 6,353,926 | B1 | 3/2002 | Parthesarathy et al. | 6,615,276 B1 | 9/2003 | Mastrianni et al. |
| 6,356,906 | B1 | 3/2002 | Lippert et al. | 6,629,109 B1 | 9/2003 | Koshisaka |
| 6,357,038 | B1 | 3/2002 | Scouten | 6,631,357 B1 | 10/2003 | Perkowski |
| 6,366,907 | B1 | 4/2002 | Fanning et al. | 6,631,379 B2 | 10/2003 | Cox |
| 6,366,912 | B1 | 4/2002 | Wallent et al. | 6,631,497 B1 | 10/2003 | Jamshidi et al. |
| 6,367,013 | B1 | 4/2002 | Bisbee et al. | 6,631,519 B1 | 10/2003 | Nicholson et al. |
| 6,369,840 | B1 | 4/2002 | Barnett et al. | 6,632,251 B1 | 10/2003 | Rutten et al. |
| 6,369,841 | B1 | 4/2002 | Salomon et al. | 6,635,089 B1 | 10/2003 | Burkett et al. |
| 6,374,402 | B1 | 4/2002 | Schmeidler et al. | 6,636,845 B2 | 10/2003 | Chau et al. |
| 6,381,742 | B2 | 4/2002 | Forbes et al. | 6,643,633 B2 | 11/2003 | Chau et al. |
| 6,381,743 | B1 | 4/2002 | Mutschler, III | 6,643,652 B2 | 11/2003 | Helgeson et al. |
| 6,389,434 | B1 | 5/2002 | Rivette et al. | 6,643,684 B1 | 11/2003 | Malkin et al. |
| 6,393,456 | B1 | 5/2002 | Ambler et al. | 6,651,217 B1 | 11/2003 | Kennedy et al. |
| 6,396,488 | B1 | 5/2002 | Simmons et al. | 6,654,737 B1 | 11/2003 | Nunez |
| 6,405,221 | B1 | 6/2002 | Levine et al. | 6,654,932 B1 | 11/2003 | Bahrs et al. |
| 6,408,311 | B1 | 6/2002 | Baisley et al. | 6,658,417 B1 | 12/2003 | Stakutis et al. |
| 6,414,700 | B1 | 7/2002 | Kurtenbach et al. | 6,658,622 B1 | 12/2003 | Aiken et al. |
| 6,421,070 | B1 | 7/2002 | Ramos et al. | 6,661,920 B1 | 12/2003 | Skinner |
| 6,421,656 | B1 | 7/2002 | Cheng et al. | 6,668,369 B1 | 12/2003 | Krebs et al. |
| 6,425,125 | B1 | 7/2002 | Fries et al. | 6,671,805 B1 | 12/2003 | Brown et al. |

| | | |
|---|---|---|
| 6,675,202 B1 | 1/2004 | Perttunen |
| 6,678,717 B1 | 1/2004 | Schneider |
| 6,681,370 B2 | 1/2004 | Gournares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,745,367 B1 | 6/2004 | Bates et al. |
| 6,748,385 B1 | 6/2004 | Rodkin et al. |
| 6,751,777 B1 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,871,220 B1 | 3/2005 | Rajan et al. |
| 6,874,130 B1 | 3/2005 | Baweja et al. |
| 6,876,996 B2 | 4/2005 | Czajkowski et al. |
| 6,889,359 B1 | 5/2005 | Conner et al. |
| 6,901,403 B1 * | 5/2005 | Bata et al. ................. 707/101 |
| 6,915,454 B1 | 7/2005 | Moore et al. |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,133 B2 | 9/2005 | Haley |
| 6,948,135 B1 | 9/2005 | Ruthfield et al. |
| 6,950,980 B1 | 9/2005 | Malcolm |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 * | 11/2005 | Stoll et al. ................. 715/712 |
| 6,993,714 B2 | 1/2006 | Kaler et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,722 B2 | 2/2006 | Rothchiller et al. |
| 7,010,580 B1 | 3/2006 | Fu et al. |
| 7,020,869 B2 | 3/2006 | Abrari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,080,083 B2 | 7/2006 | Kim et al. |
| 7,080,325 B2 | 7/2006 | Treibach-Heck et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 * | 9/2006 | Santos ........................ 715/513 |
| 7,146,564 B2 | 12/2006 | Kim et al. |
| 7,152,205 B2 | 12/2006 | Day et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,213,200 B2 | 5/2007 | Abe et al. |
| 7,236,982 B2 | 6/2007 | Zlatanov et al. |
| 7,272,789 B2 | 9/2007 | O'Brien |
| 7,281,018 B1 | 10/2007 | Begun et al. |
| 7,296,017 B2 | 11/2007 | Larcheveque et al. |
| 7,313,757 B2 * | 12/2007 | Bradley et al. ............... 715/234 |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,178 B1 | 2/2008 | Stanciu et al. |
| 7,346,610 B2 | 3/2008 | Ruthfield et al. |
| 7,350,141 B2 | 3/2008 | Kotler et al. |
| 2001/0007109 A1 | 7/2001 | Lange |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0054004 A1 | 12/2001 | Powers |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk, Jr. et al. |
| 2002/0013788 A1 | 1/2002 | Pennell et al. |
| 2002/0019941 A1 | 2/2002 | Chan et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 * | 3/2002 | Voskuil ........................ 709/224 |
| 2002/0035579 A1 * | 3/2002 | Wang et al. ................. 707/513 |
| 2002/0035581 A1 | 3/2002 | Reynar et al. |
| 2002/0040469 A1 | 4/2002 | Pramberger |
| 2002/0054126 A1 | 5/2002 | Gamon |
| 2002/0054128 A1 | 5/2002 | Lau et al. |
| 2002/0057297 A1 | 5/2002 | Grimes et al. |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083318 A1 | 6/2002 | Larose |
| 2002/0099952 A1 | 7/2002 | Lambert et al. |
| 2002/0100027 A1 | 7/2002 | Binding et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178380 A1 | 11/2002 | Wolf et al. |
| 2002/0184219 A1 | 12/2002 | Preisig et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |

| | | | | | | |
|---|---|---|---|---|---|---|
| 2002/0196288 A1 | 12/2002 | Emrani | | 2004/0044965 A1 | 3/2004 | Toyama et al. |
| 2002/0198891 A1 | 12/2002 | Li et al. | | 2004/0054966 A1 | 3/2004 | Busch et al. |
| 2002/0198935 A1 | 12/2002 | Crandall et al. | | 2004/0059754 A1 | 3/2004 | Barghout et al. |
| 2003/0004951 A1 | 1/2003 | Chokshi | | 2004/0073565 A1 | 4/2004 | Kaufman et al. |
| 2003/0007000 A1 | 1/2003 | Carlson et al. | | 2004/0073868 A1 | 4/2004 | Easter et al. |
| 2003/0014397 A1 | 1/2003 | Chau et al. | | 2004/0078756 A1 | 4/2004 | Napper et al. |
| 2003/0018668 A1 | 1/2003 | Britton et al. | | 2004/0083426 A1 | 4/2004 | Sahu |
| 2003/0020746 A1 | 1/2003 | Chen et al. | | 2004/0088647 A1 | 5/2004 | Miller et al. |
| 2003/0023641 A1 | 1/2003 | Gorman et al. | | 2004/0088652 A1 | 5/2004 | Abe et al. |
| 2003/0025732 A1 | 2/2003 | Prichard | | 2004/0093596 A1 | 5/2004 | Koyano |
| 2003/0026507 A1 | 2/2003 | Zlotnick | | 2004/0107367 A1 | 6/2004 | Kisters |
| 2003/0028550 A1 | 2/2003 | Lee et al. | | 2004/0117769 A1* | 6/2004 | Lauzon et al. ............. 717/125 |
| 2003/0033037 A1 | 2/2003 | Yuen et al. | | 2004/0123277 A1 | 6/2004 | Schrader et al. |
| 2003/0037303 A1 | 2/2003 | Bodlaender et al. | | 2004/0146199 A1 | 7/2004 | Berkner et al. |
| 2003/0043986 A1 | 3/2003 | Creamer et al. | | 2004/0163041 A1 | 8/2004 | Engel |
| 2003/0046665 A1 | 3/2003 | Ilin | | 2004/0172442 A1 | 9/2004 | Ripley |
| 2003/0048301 A1 | 3/2003 | Menninger | | 2004/0181711 A1 | 9/2004 | Johnson et al. |
| 2003/0051243 A1 | 3/2003 | Lemmons et al. | | 2004/0186762 A1 | 9/2004 | Beaven et al. |
| 2003/0055811 A1 | 3/2003 | Stork et al. | | 2004/0189716 A1 | 9/2004 | Paoli et al. |
| 2003/0055828 A1 | 3/2003 | Koch et al. | | 2004/0194035 A1 | 9/2004 | Chakraborty |
| 2003/0056198 A1 | 3/2003 | Al-Azzawe et al. | | 2004/0205473 A1 | 10/2004 | Fisher et al. |
| 2003/0061386 A1 | 3/2003 | Brown et al. | | 2004/0205525 A1 | 10/2004 | Murren et al. |
| 2003/0061567 A1 | 3/2003 | Brown et al. | | 2004/0205534 A1 | 10/2004 | Koelle |
| 2003/0084424 A1 | 5/2003 | Reddy et al. | | 2004/0205571 A1* | 10/2004 | Adler et al. ................. 715/513 |
| 2003/0093755 A1 | 5/2003 | O'Carroll | | 2004/0205592 A1 | 10/2004 | Huang |
| 2003/0110443 A1 | 6/2003 | Yankovich et al. | | 2004/0205605 A1 | 10/2004 | Adler et al. |
| 2003/0120578 A1 | 6/2003 | Newman | | 2004/0205653 A1 | 10/2004 | Hadfield et al. |
| 2003/0120651 A1 | 6/2003 | Bernstein et al. | | 2004/0205671 A1 | 10/2004 | Sukehiro et al. |
| 2003/0120659 A1 | 6/2003 | Sridhar | | 2004/0210599 A1 | 10/2004 | Friedman et al. |
| 2003/0120671 A1* | 6/2003 | Kim et al. ................... 707/100 | | 2004/0221238 A1 | 11/2004 | Cifra et al. |
| 2003/0120686 A1 | 6/2003 | Kim et al. | | 2004/0221245 A1 | 11/2004 | Chickles et al. |
| 2003/0126555 A1 | 7/2003 | Aggarwal et al. | | 2004/0237030 A1 | 11/2004 | Malkin |
| 2003/0128196 A1 | 7/2003 | Lapstun et al. | | 2004/0261019 A1 | 12/2004 | Imamura et al. |
| 2003/0135825 A1 | 7/2003 | Gertner et al. | | 2004/0268229 A1 | 12/2004 | Paoli et al. |
| 2003/0140132 A1* | 7/2003 | Champagne et al. ........ 709/223 | | 2005/0004893 A1 | 1/2005 | Sangroniz |
| 2003/0158897 A1 | 8/2003 | Ben-Natan et al. | | 2005/0005248 A1 | 1/2005 | Rockey et al. |
| 2003/0163285 A1 | 8/2003 | Nakamura et al. | | 2005/0015279 A1 | 1/2005 | Rucker |
| 2003/0167277 A1 | 9/2003 | Hejlsberg et al. | | 2005/0015732 A1 | 1/2005 | Vedula et al. |
| 2003/0182268 A1 | 9/2003 | Lal | | 2005/0022115 A1 | 1/2005 | Baumgartner et al. |
| 2003/0182327 A1 | 9/2003 | Ramanujam et al. | | 2005/0027757 A1 | 2/2005 | Kiessig et al. |
| 2003/0187756 A1 | 10/2003 | Klivington et al. | | 2005/0033728 A1 | 2/2005 | James |
| 2003/0187930 A1 | 10/2003 | Ghaffar et al. | | 2005/0038711 A1 | 2/2005 | Marlelo |
| 2003/0188260 A1 | 10/2003 | Jensen et al. | | 2005/0055627 A1 | 3/2005 | Lloyd et al. |
| 2003/0189593 A1 | 10/2003 | Yarvin | | 2005/0060324 A1 | 3/2005 | Johnson et al. |
| 2003/0192008 A1 | 10/2003 | Lee | | 2005/0060721 A1 | 3/2005 | Choudhary et al. |
| 2003/0200506 A1 | 10/2003 | Abe et al. | | 2005/0065933 A1 | 3/2005 | Goering |
| 2003/0204511 A1 | 10/2003 | Brundage et al. | | 2005/0065936 A1 | 3/2005 | Goering |
| 2003/0204814 A1 | 10/2003 | Elo et al. | | 2005/0066287 A1 | 3/2005 | Tattrie et al. |
| 2003/0205615 A1 | 11/2003 | Marappan | | 2005/0071752 A1 | 3/2005 | Marlatt |
| 2003/0212664 A1 | 11/2003 | Breining et al. | | 2005/0076049 A1 | 4/2005 | Qubti et al. |
| 2003/0212902 A1 | 11/2003 | van der Made | | 2005/0091285 A1 | 4/2005 | Krishnan et al. |
| 2003/0217053 A1 | 11/2003 | Bachman et al. | | 2005/0091305 A1 | 4/2005 | Lange et al. |
| 2003/0220930 A1 | 11/2003 | Milleker et al. | | 2005/0102370 A1 | 5/2005 | Lin et al. |
| 2003/0225469 A1 | 12/2003 | DeRemer et al. | | 2005/0102612 A1 | 5/2005 | Allan et al. |
| 2003/0225768 A1 | 12/2003 | Chaudhuri et al. | | 2005/0108104 A1 | 5/2005 | Woo |
| 2003/0225829 A1* | 12/2003 | Pena et al. ................... 709/203 | | 2005/0108624 A1 | 5/2005 | Carrier |
| 2003/0226132 A1 | 12/2003 | Tondreau et al. | | 2005/0114757 A1 | 5/2005 | Sahota et al. |
| 2003/0233374 A1 | 12/2003 | Spinola et al. | | 2005/0132196 A1 | 6/2005 | Dietl |
| 2003/0233644 A1 | 12/2003 | Cohen et al. | | 2005/0138086 A1 | 6/2005 | Pecht-Seibert |
| 2003/0236859 A1 | 12/2003 | Vaschillo et al. | | 2005/0171746 A1 | 8/2005 | Thalhammer-Reyero |
| 2003/0236903 A1 | 12/2003 | Piotrowski | | 2005/0198086 A1 | 9/2005 | Moore et al. |
| 2003/0237046 A1* | 12/2003 | Parker et al. ................. 715/513 | | 2005/0198125 A1 | 9/2005 | Beck et al. |
| 2003/0237047 A1 | 12/2003 | Borson | | 2005/0198247 A1 | 9/2005 | Perry et al. |
| 2004/0002939 A1 | 1/2004 | Arora et al. | | 2005/0223063 A1 | 10/2005 | Chang et al. |
| 2004/0003031 A1 | 1/2004 | Brown et al. | | 2005/0223320 A1 | 10/2005 | Brintzenhofe et al. |
| 2004/0003353 A1 | 1/2004 | Rivera et al. | | 2005/0240876 A1 | 10/2005 | Myers et al. |
| 2004/0003389 A1 | 1/2004 | Reynar et al. | | 2005/0246304 A1 | 11/2005 | Knight et al. |
| 2004/0010752 A1 | 1/2004 | Chan et al. | | 2005/0268222 A1 | 12/2005 | Cheng |
| 2004/0024842 A1 | 2/2004 | Witt | | 2006/0020586 A1 | 1/2006 | Prompt et al. |
| 2004/0030991 A1 | 2/2004 | Hepworth et al. | | 2006/0026534 A1 | 2/2006 | Ruthfield et al. |
| 2004/0039990 A1 | 2/2004 | Bakar et al. | | 2006/0031757 A9 | 2/2006 | Vincent |
| 2004/0039993 A1 | 2/2004 | Kougiouris et al. | | 2006/0036995 A1 | 2/2006 | Chickles et al. |
| 2004/0044961 A1 | 3/2004 | Pesenson | | 2006/0041838 A1 | 2/2006 | Khan |

| | | | |
|---|---|---|---|
| 2006/0059434 | A1 | 3/2006 | Boss et al. |
| 2006/0069605 | A1 | 3/2006 | Hatoun |
| 2006/0069985 | A1 | 3/2006 | Friedman et al. |
| 2006/0080657 | A1 | 4/2006 | Goodman |
| 2006/0085409 | A1 | 4/2006 | Rys et al. |
| 2006/0101037 | A1 | 5/2006 | Brill et al. |
| 2006/0101051 | A1 | 5/2006 | Carr et al. |
| 2006/0129978 | A1 | 6/2006 | Abrari et al. |
| 2006/0143220 | A1 | 6/2006 | Spencer |
| 2006/0161559 | A1 | 7/2006 | Bordawekar et al. |
| 2007/0036433 | A1 | 2/2007 | Teutsch et al. |
| 2007/0050719 | A1 | 3/2007 | Lui et al. |
| 2007/0061467 | A1 | 3/2007 | Essey |
| 2007/0061706 | A1 | 3/2007 | Cupala |
| 2007/0074106 | A1 | 3/2007 | Ardeleanu |
| 2007/0094589 | A1 | 4/2007 | Paoli |
| 2007/0100877 | A1 | 5/2007 | Paoli |
| 2007/0101280 | A1 | 5/2007 | Paoli |
| 2007/0118803 | A1 | 5/2007 | Walker et al. |
| 2007/0130504 | A1 | 6/2007 | Betancourt et al. |
| 2007/0208606 | A1 | 9/2007 | MacKay et al. |
| 2007/0208769 | A1 | 9/2007 | Boehm et al. |
| 2008/0028340 | A1 | 1/2008 | Davis |

FOREIGN PATENT DOCUMENTS

| | | |
|---|---|---|
| EP | 0 961 197 | 12/1999 |
| EP | 1 076 290 A2 | 2/2001 |
| EP | 1221661 | 7/2002 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 63085960 | 4/1998 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 A1 | 6/2001 |
| WO | WO0157720 | 8/2001 |
| WO | WO0157720 | 9/2006 |

OTHER PUBLICATIONS

Altova, "User Reference Manual Version 4.4, XML Spy Suite 4.4," Altova Ges.m.b.H & Altova, Inc., May 24, 2002.*
Bradley, "The XML Companion, Third Edition", published by Addison Wesley Professional, Dec. 12, 2001, downloaded from Safari Books Online, http://proquest.safaribooksonline.com/021770598, p. 1-18.*
Klarlund et al., "DSD: A Schema Language for XML", copyright 2000 ACM, FMSP '00, Portland Oregon, p. 101-111.*
Clark, J, Editor, "XSL Transformation (XSLT), Version 1.0," W3C, available at <http://www.w3.org/TR/1999/REC-xslt-19991116>, Nov. 16, 1999, pp. 1-156.
Clark, J. et al., editors, "XML Path Language (XPath), Version 1.0," W3C, available at <http://www.w3.org/TR/1999/REC-xpath-19991116>, Nov. 16, 1999, pp. 1-49.
Description of Whitehill Composer software product, produced by Whitehill Technologies, Inc., available at <http://www.xml.com/pub/p/221>, accessed on Apr. 8, 2004, two pages.
U.S. Appl. No. 60/209,713, Kutay et al., filed Jun. 5, 2000.
Chien, Shu-Yao, et al., "XML Document Versioning," SIGMOD Record, vol. 30, No. 3, Sep. 2001, pp. 46-53.
Wong, Raymond, et al., "Managing and Querying Multi-Version XML Data with Update Logging," Proceedings of the 2002 ACM Symposium on Document Engineering, 2002, ACM Press, pp. 74-81.
Chien, Shu-Yao, et al., "Efficient Schemes for Managing Multiversion XML Documents," The VLDB Journal, No. 11, 2002, pp. 332-353.
Chien, Shu-Yao, et al., "Efficient Management of Multiversion Documents by Object Referencing," Proceedings of the 27$^{th}$ VLDB Conference, Roma, Italy, 2001, pp. 291-300.
Roggè, Boris et al., "Validating MPEG-21 Encapsulated Functional Metadata," IEEE 2002, pp. 209-212.
Nelson, Mark, "Validation with MSXML and XML Schema," Windows Developer Magazine, Jan. 2002, pp. 35-38.
Hall, Richard Scott," Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.
Dayton, Linnea and Jack Davis, "Photo Shop 5/5.5 WOW! Book," 2000, Peachpit Press, pp. 8-17.
Williams, Sara and Charlie Kindel, "The Component Object Model: A Technical Overview," Oct. 1994, Microsoft Corp., pp. 1-14.
Varlamis, Iraklis, et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.
Kim, Sang-Kyun, et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.
Chuang, Tyng-Ruey, "Generic Validation of Structural Content with Parametric Modules," ICFP '01, Sep. 3-5, 2001, Copyright 2001, ACM 1-58113-415-0/01/0009, pp. 98-109.
Chen, Ya Bing, et al., "Designing Valid XML Views," ER 2002, LNCS 2503, 2002, Springer-Verlag Berlin Heidelberg 2002, pp. 463-477.
Chen, Yi, et al., "XKvalidator: A Constraint Validator for XML," CIKM '02, Nov. 4-9, 2002, Copyright 2002, ACM 1-58113-492-4/02/0011, pp. 446-452.
Brogden, William, "Arbortext Adept 8 Editor Review," O'Reilly XML.COM, Online! Sep. 22, 1999, XP002230080, retrieved from the Internet <URL:http://www.xml.com/pub/a/1999/09/adept/AdeptRvw.htm>, retrieved on Feb. 5, 2003.
Alschuler, Liora, "A tour of XMetal," XML.COM, Online! Jul. 14, 1999, XP002230081, retrieved from the Internet: <URL:http://www.xml.com/pub/a/SeyboldReport/ip031102.html>, retrieved on Feb. 5, 2003.
Davidow, Ari, "XML Editors: Allegations of Functionality in search of reality," Internet, Online! 1999, XP002230082, retrieved from the Internet, <URL:http://www.ivritype.com/xml/>.
Battle, Steven A. et al., "Flexible Information Presentation with XML", 1998, The Institution of Electrical Engineers, 6 pages.
Ciancarini, Paolo et al., "Managing Complex Documents over the WWW: A Case Study for XML," IEEE Transactions on Knowledge and Data Engineering, vol. 11, No. 4, Jul./Aug. 1999, pp. 629-638.
Kanemoto, Hirotaka et al., "An Efficiently Updatable Index Scheme for Structured Documents," 1998 IEEE, pp. 991-996.
Usdin, Tommie et al., "XML: Not a Silver Bullet, But a Great Pipe Wrench," Standardview vol. 6, No. 3, Sep. 1998, pp. 125-132.
Sutanthavibul, Supoj et al., "XFIG Version 3.2 Patchlevel 2(Jul. 2, 1998) Users Manual (Edition 1.0)," Internet Document, [Online] July 2, 1998, XP0022231937 Retrieved from the Internet: URL:http://www.ice/mtu.edu/online_docs/xfig332/, retrieved on Jan. 28, 2003.
Netscape Communication Corporation, "Netscape Communicator 4.61 for OS/2 Warp" Software, 1999, The whole software release & "Netscape—Version 4.61 [en]—010615," Netscape Screenshot, Oct. 2, 2002.
"Architecture for a Dynamic Information Area Control," IBM Technical Disclosure Bulletin, IBM Corp., New York, US, vol. 37, No. 10, Jan. 10, 1994, pp. 245-246.
Au, Irene et al., "Netscape Communicator's Collapsible Toolbars," CHI '98, Human Factors in Computing Systems, Conference Proceedings, Los Angeles, CA, Apr. 18-23, 1998, pp. 81-86.
Dyck, Timothy, "XML Spy Tops as XML Editor," http://www.eweek.com/article2/0,3959,724041,00.asp, Nov. 25, 2002, 2 pages.

Hardy, Matthew R. B. et al., "Mapping and Displaying Structural Transformations between XML and PDF," DocEng '02, Nov. 8-9, 2002, Copyright 2002, ACM 1-58113-594-7/02/0011, pp. 95-102.

Clark, P., "From small beginnings," Knowledge Management, Nov. 2001, pp. 28-30.

Prevelakis, Vassilis et al., "Sandboxing Applications," FREENIX Track: 2001 USENIX Annual Technical Conference, pp. 119-126.

Sun, Q., et al., "A Robust and Secure Media Signature Scheme for JPEG Images," Proceedings of 2002 IEEE Workshop on Multimedia Signal Processing, Dec. 2002, pp. 296-299.

Komatsu, N., et al., "A Proposal on Digital Watermark in Document Image Communication and Its Application to Realizing a Signature," Electronics and Communications in Japan, Part I: Communications, vol. 73, No. 5, MAy 1990, pp. 22-33.

Noore, A., "A Secure Conditional Access System using Digital Signature and Encryption," International Conference on Consumer Electronics, Jun. 2003, pp. 220-221.

Pacheco, X., et al., "Delphi 5 Developer's Guide," Sams Publishing 1999, Section: Data Streaming, 6 pages.

Hwang, Kai et al., "Micro-Firewalls for Dynamic Network Security with Distributed Intrusion Detection," IEEE Int'l. Symposium on Network Computing and Applications, 2001, pp. 68-79.

Schmid, M. et al., "Protecting Data from Malicious Software," 18th Annual Security Applications Conference, 2002, pp. 199-208.

Kaiya, Haruhiko et al., "Specifying Runtime Environments and Functionalities of Downloadable Components under the Sandbox Model," Int'l. Symposium on Principles of Software Evolution, 2000, pp. 138-142.

Tomimori, Hiroyuki et al., "An Efficient and Flexible Access Control Framework for Jav aPrograms in Mobile Terminals," Proceedings of 22nd Int'l. Conference on Distributed Computing Systems Workshops, 2002, pp. 777-782.

Pike, et al., "Plan 9 From Bell Labs," AT&T Bell Laboratories, UKUUG, Summer 1990, 10 pages.

Berg., A, "Naming and Binding: Monikers," *Inside OLE*, Chapter 9, Harmony Books, 1995, pp. 431-490.

Herzner, et al., "CDAM-Compound Document Access and Management. An Object-Oriented Approach," Multimedia Systems Interaction and Applications, Chapter 3, 1992, pp. 17-36.

Staneck, W. "Internal and External Media," Electronic Publishing Unleashed, Chapter 22, 1995, pp. 510-542.

Kobayashi, et al., "An Update on BTRON-specification OS Development," 0-8186-2475-2/91, IEEE 1991 pp. 132-140.

Peterson, B., "Unix Variants," Unix Review, vol. 10, No. 4, Apr. 1992, pp. 29-31.

"Store and Organize Related Project Files in a Binder," Getting Results with Microsoft Office, 1990, pp. 109-112.

Clapp, D., "The NeXT Application Kit Part I: Non-Responsive Classes," The NeXT Bible Chapter 16, 1990, pp. 275-293.

Diclascia, et al., "Sweeper," Microsoft Interactive Developer, vol. 1, No. 1, 1996, 27 pages.

Barker, et al., "Creating In-Line Objects Within An Integrated Editing Environment," IBM Technical Disclosure Bulletin, vol. 27, No. 5, Oct. 1984, p. 2962.

Pike et al., "The Use of Name Spaces in Plan 9," Operating Systems Review, vol. 27, No. 2, Apr. 1993, pp. 72-76.

Trupin, J., "The Visual Programmer," Microsoft Systems Journal, Apr. 1996, pp. 103-105.

Zdonik S., "Object Management System Concepts," ACM, 1984, pp. 13-19.

OMG XML Matadata Interchange (XMI) Specification, Version 1.2, Jan. 2002.

Altova, Inc., "XML Spy 4.0 Manual," Altova Inc. & Altova GmbH, coyright 1998-2001, Chapters 1, 2 and 6, encompassing pp. 1-17, 18-90 and 343-362.

Cybook, Inc.: "Copying the Search Form to Services-based Web Sites" INternet Article, (online) Jul. 26, 2004.*the whole document*.

Macromedia, Inc.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Microsoft Word MVP FAQ Site, (online) Apr. 30, 2004, the whole document.

Laura Acklen and Read Gilgen, "Using Corel Wordperfect 9", 251-284, 424-434, 583-586 (1998).

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Bruce Halbert et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Ixia Soft, "Streamlining content creation, retrieval, and publishing on the Web using TEXTML Server and SML Spy 4 Suite in an integrated, Web publishing environment," Partner's Whitepaper, published on the Web as of Jun. 6, 2002, downlowad pp. 1-16.

Kutay, U.S. Appl. No. 60/209,713, filed June 5, 2000, entitled, "Methods and systems for accessing, organizing presenting and viewing data".

LeBlond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997", pp. 578-579; Redmond WA 98052-6399.

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Cover, "XML Forms Architecture", retrieved at <<http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, p. 7.

Microsoft Corporation, "Microsoft Computer Dictionary" Microsoft Press, Fifth Edition. p. 149.

Baraband et al., PowerForms: "Declarative Client Site Form Field Validation", World Wide Web, Baltzer Science Publishers, Bussum, NL. vol. 3, No. 4, Dec. 2000, p. 1-20.

"Microsoft Word 2000", Screenshots,(1999), 1-5.

Borland, Russo , "Running Microsoft Word 97", 314-315, 338, 361-362, 390, and 714-719.

Braband, et al., "Power Forms Declarative Client-side Form Field Validation", (2002), 1-20.

Singh, Darshan "Microsoft InfoPath 2003 By Example", Retrieved from the Internet at http://www.perfectxml.com/InfoPath.asp on Jan. 21, 2007, (Apr. 20, 2003).

Raman, T. V. et al., "XForms 1.0", (Dec. 2001),Section 1-12.2.3 & Appendices A-G.

"Enter Key", Retrieved from the Internet at http://systems.webopedia.com/TERM/Enter_key.html on Dec. 20, 2006.

Lehtonen, Miro et al., "A Dynamic User Interface for Document Assembly", Department of Computer Science, University of Helsinki,(Nov. 2002).

Rees, Michael J., "Evolving the Browser Towards a Standard User Interface Architecture", School of Information Technology, Bond University, Australia,(2001).

"Microsoft Visual Basic 5.0 Programmer's Guide", *Microsoft Press*, (1997),pp. 42-43, 54-58.

Nelson, Joe "Client-side Form Validation Using JavaScript", *Developer Advisory*, (Sep. 21, 2001).

Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Dubinko, Micah "XForms and Microsoft InfoPath", Retrieved from the Internet at http://www.xml.com/lpt/a/1311 on Jan. 21, 2007,(Oct. 29, 2003).

Udell, Jon "InfoPath and XForms", Retrieved from the Internet at http://weblog.infoworld.com/udell/2003/02/26.html,(Feb. 26, 2003).

Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Anat, Eyal et al., "Integrating and Customizing Hererogeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

Altova, et al., "User and Reference Manual Version 4.4", www.xmlspy.com, (May 24, 2007),1-565.

"XForm 1.0", W3C,(Jul. 16, 2001).

Grosso, et al., "XML Fragment Interchange", W3C,(Feb. 2001),1-28.

"Microsoft Word 2000 Screenshots", (2000),11-17.

Pacheco, Xavier et al., "Delphi 5 Developer's Guide", Sams Publishing. Chapter 31, Section: Data Streaming,(1999),4.

XMLSPY, "XmlSpy 2004 Enterprise Edition Manual", Altova,(May 17, 2004),1-25, 220-225.

StylusStudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Watt, Andrew "Microsoft Office InfoPath 2003 Kick Start", (*Published by Sams*) *Print ISBN-10:0-672-32623-X*, (Mar. 24, 2004),1-57.

Hu, et al., "a Programmable Editor for Developing Structured Documents based on Bidirectional Transformations", ACM,(Aug. 2004), 178-179.

Musgrave, S.; "Network Technology - Impact and Opportunities"; Survey and Statistical Computing 1996; Proceedings of the Second ASC International Conference, London, UK, Sep. 1996; pp. 369-378.

Chien, et al; "Storing and Quering Multiversion XML Documents using Durable Node Numbers"; 0-7695-1393-X/02; pp. 232-241; 2002 IEEE.

* cited by examiner

```
<my:myFields>
  <my:Contact>
    <my:FirstName>John</my:FirstName>
    <my:LastName>Smith</my:LastName>
  </my:Contact>
</my:myFields>
```
1302

```
<xsl:template match="my:Contact" mode="_1">
  <xsl:copy>
    <xsl:element name="my:FirstName">
      <xsl:copy-of select="my:FirstName/text()[1]"/>
    </xsl:element>
    <xsl:element name="my:LastName">
      <xsl:copy-of select="my:LastName/text()[1]"/>
    </xsl:element>
    <xsl:element name="my:Age">
      <xsl:choose>
        <xsl:when test="my:Age">
          <xsl:copy-of select="my:Age/text()[1]"/>
        </xsl:when>
        <xsl:otherwise>18</xsl:otherwise>
      </xsl:choose>
    </xsl:element>
  </xsl:copy>
</xsl:template>
```
1304

1306

```
<my:myFields>
  <my:Contact>
    <my:FirstName>John</my:FirstName>
    <my:LastName>Smith</my:LastName>
    <my:Age>18</my:Age>
  </my:Contact>
</my:myFields>
```
1308

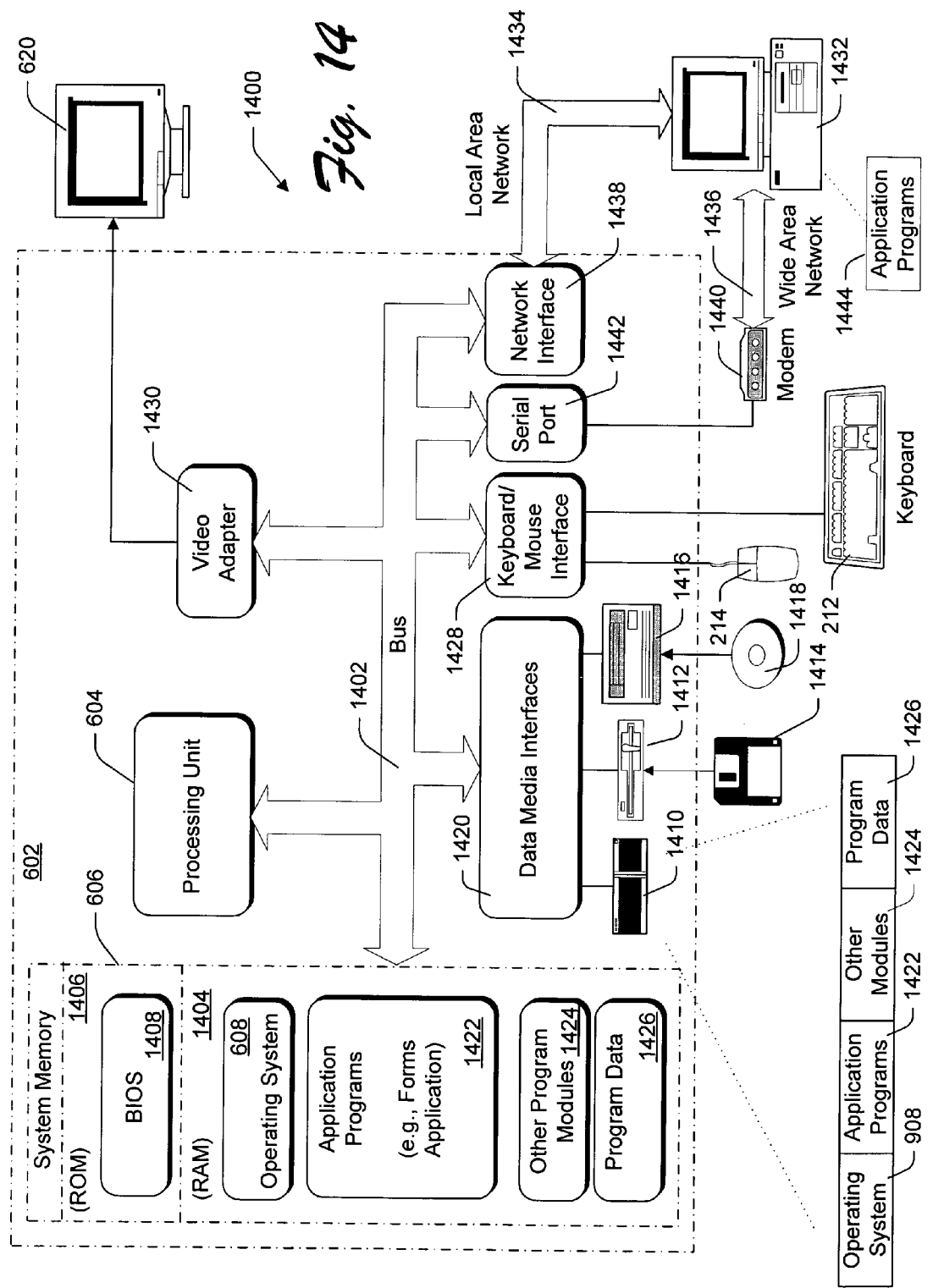

CONVERSION OF STRUCTURED DOCUMENTS

TECHNICAL FIELD

This invention relates to upgrading documents so that the documents are compatible with a version of a document processing mechanism that is used to process the documents. In a more particular implementation, this invention relates to upgrading arbitrary markup language documents so that the documents match a version of a document processing mechanism used to display and edit the markup language documents. In this disclosure, the term "upgrading" has broad connotation, encompassing any kind of modification of a document.

BACKGROUND

A document created using a particular version of a document processing mechanism often cannot be satisfactorily processed by later versions of the document processing mechanism. For example, documents created using a particular version of a word processing application or a spreadsheet application (referred to as "original documents") often cannot be adequately processed by later versions of these applications. For instance, the original documents may lack information that is needed to fully exploit enhanced functionality provided by the later developed versions of the applications. This can result in the suboptimal rendering of the original documents in the later developed versions of these applications, or in extreme cases, the inability to render any information gleaned from the original documents. And even if the original documents can be displayed, these documents may exhibit suboptimal behavior when processed by later versions of these applications.

Applications developed specifically to render and process markup language documents share the above shortcomings. A typical application includes an Extensible Stylesheet Language (XSL) processor that transforms a document expressed in the Extensible Markup Language (XML) to a document expressed in some presentation-oriented markup language, such as Hypertext Markup Language (HTML). The XSL processor uses a collection of XSL files in transforming XML into HTML, wherein these files effectively specify the appearance of the document as rendered using HTML. The XSL files might have been specifically developed to process particular kinds of XML documents characterized by a specified schema. Subsequently, a developer may have made significant changes in the XSL files to enable processing of new kinds of XML documents having new characteristics, possibly governed by a new schema. Due to these changes, the XSL processor might not be able to satisfactorily process the kinds of XML documents for which it was originally designed. The presentation of the original XML documents using the upgraded XSL files may produce errors, or may be completely proscribed.

FIG. 1 illustrates a conventional strategy for addressing the above-noted problems. FIG. 1 specifically addresses the case of a program-oriented application, such as a word processor (rather than a declarative-oriented rendering mechanism, such as a markup language browser). In this environment, an application program is upgraded from an application version V1 102 to an application version V2 104. Application version V2 104 may include additional functionality compared to application version V1 102, or may omit certain functionality present in the application version V1 102.

In the scenario shown in FIG. 1, a document 106 has been generated by application version V1 102, and it is subsequently desired to process this document 106 using application version V2 104 and render this document 106 on a display device 108. The conventional strategy for handling this task is to provide conversion logic 110. The conversion logic 110 converts the document 106 into a form suitable for processing by application version V2 104 and for presentation on the display device 108. The conversion logic 110 can be implemented as add-on code associated with application version V2 104.

The above strategy has a number of drawbacks. The conversion logic 110 is specifically tailored to translate information produced by application version V1 102 into information expected by application version V2. Hence, the characteristics of the conversion logic 110 are specifically predicated on a detailed comparison between application versions V1 and V2 (102, 104). As such, the conversion logic 110 might not be able to satisfactorily process documents produced by other sources, and it might not be able to process documents in conjunction with other versions of document processing mechanisms. For example, the conversion logic 110 might not be able to process a document produced by some other predecessor version of the application, such as an application version V0.5, etc. Further, the conversion logic 110 may no longer provide satisfactory results for documents 106 produced by application version V1 102 when the application program is upgraded in the future to a later version—say, for example, version V3. In summary, the conversion logic 110 cannot, and was never intended to, handle documents having arbitrary form and content. In other words, the conversion logic 110 is narrowly tailored to the task of translating between applications V1 102 and V2 104. Markup language processors (e.g., browsers) often resort to a similar tactic to that shown in FIG. 1, and therefore suffer from the same shortcomings discussed above.

In the traditional approach, a developer would address these problems by adding modules to the conversion logic 110 to address different permutations in document conversion scenarios. This has drawbacks, because it requires the developers to develop new code each time the processing environment changes.

Based on the foregoing, there is an exemplary need in the art for a more efficient and flexible technique for upgrading documents so that they are compatible with current versions of document processing mechanisms, such as markup language document processing mechanisms.

SUMMARY

According to one exemplary implementation, a method is described for upgrading documents for processing by processing functionality. The method includes: (a) inputting a structured document having particular features associated therewith into a particular version of the processing functionality; (b) determining whether each of the particular features matches a set of expected features associated with the particular version of the processing functionality; and (c) modifying the particular features of the input structured document so that the particular features match the set of expected features to thereby provide a modified structured document. After the above-described modification, the method includes: (d) transforming the modified structured document into another document suitable for presentation; (e) displaying the other document suitable for presentation using the processing functionality to provide a displayed document; and (f) editing the displayed document.

The input structured document can be expressed in the extensible markup language (XML). The other document can be expressed in the hypertext markup language (HTML). In one implementation, the operation of modifying is implemented using an upgrade module that provides a transformation function using extensible stylesheet language (XSL).

The above-referenced determining of whether each of the particular features matches a set of expected features associated with the particular version of the processing functionality can include determining whether the input structured document contains each node expected by the particular version of the processing functionality. The above-referenced modifying of the particular features of the input structured document to produce the modified structured document can include: (c1) creating each node expected by the particular version of the processing functionality to provide created nodes; (c2) copying node content from the input structured document into corresponding created nodes in the modified structured document for those nodes in the input structured document that have counterpart nodes expected by the particular version of the processing functionality; and (c3) creating default node content in corresponding nodes in the modified structured document for those created nodes that do not have counterpart nodes in the input structured document.

In one case, the above-referenced "expected features" are specified by a schema associated with the particular version of the processing functionality. In another case, the above-referenced "expected features" are specified by some information other than the schema associated with the particular version of the processing functionality (such as aspects pertaining to the visual presentation of the document that are not dictated by the schema).

According to another exemplary implementation, a method is described for generating an upgrade module for upgrading documents for processing by processing functionality. The method includes: (a) determining whether a particular version of the processing functionality has been created that warrants generation of the upgrade module; and (b) generating the upgrade module if the creation of the particular version warrants the generation of the upgrade module.

Related apparatus and computer readable media are also described herein, as well as additional subject matter.

BRIEF DESCRIPTION OF THE DRAWINGS

FIG. 13 shows the use of an exemplary XSL upgrade module to convert an input XML document into a transformed XML document.

FIG. 14 shows an exemplary computing environment for implementing the data processing application shown in FIGS. 2 and 6.

Figure 1:
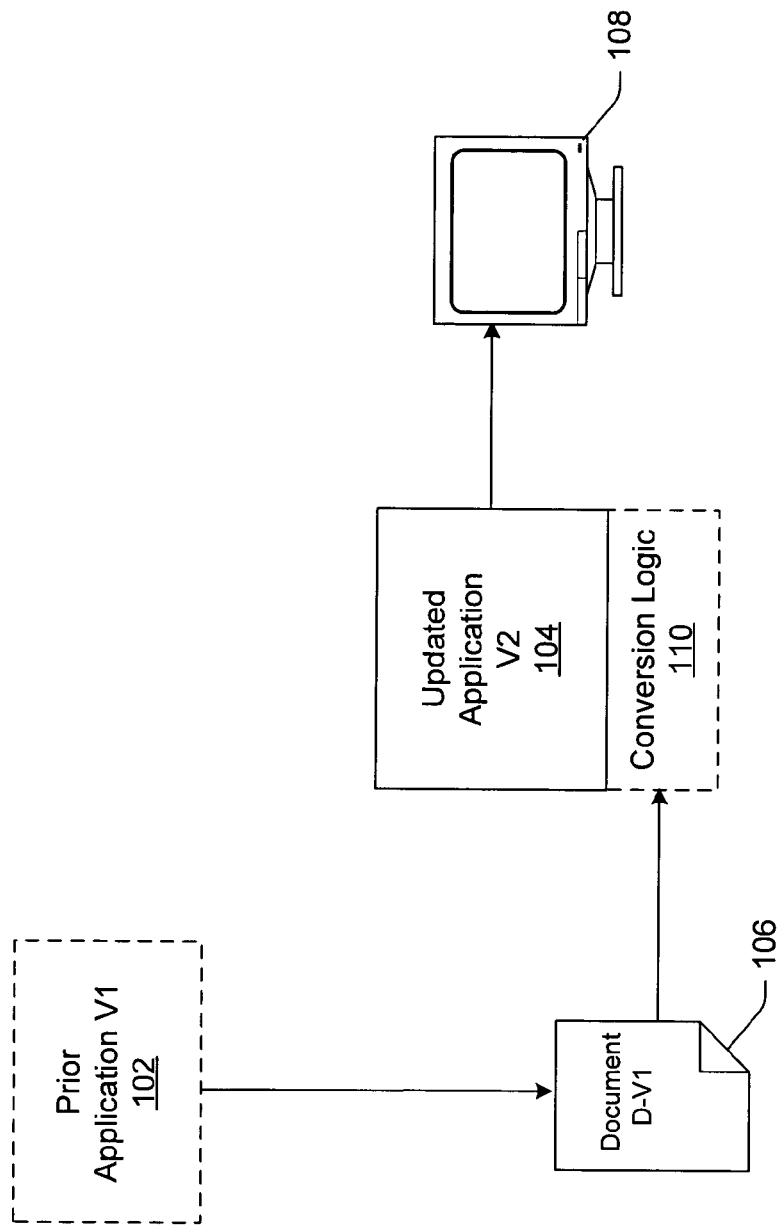
FIG. 1 shows a known technique for upgrading documents produced by a version V1 of an application so that the documents are compatible with a version V2 of the application.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to the visual rendering and editing of structured documents using a data processing application. To provide a concrete framework for discussion, this disclosure will specifically describe the transformation of hierarchically organized data expressed in a markup language into an electronic form that can be visually rendered and edited by an end user. Exemplary forms include a timesheet, work order, travel log, and so on. However, the concepts described herein also have application to other data processing applications besides electronic forms processing.

The terms "upgrade" and "version" have broad connotation as used in this disclosure. "Upgrading" a document refers generally to modifying the document in any manner to suit expectations of a current manifestation (e.g., version) of the document processing application. In one case, an upgrade refers to a scenario in which a user modifies a document produced by an earlier version of a document processing application to be compatible with a later developed, more enhanced, version of the data processing application. However, the term "upgrade" can also refer to modifying a document produced by a later version of the document processing application so that it is compatible with an earlier version of the document processing application. Accordingly, the term "upgrade" as used herein is value-neutral; it could refer to changes that are considered "better" and "worse" than an original version depending on one's particular data processing requirements and objectives. In still a broader interpretation, the term "upgrade" can refer to the modification of any kind of document produced by any kind of initial document processing application, where such initial document processing application is not considered a predecessor or successor to a current version of a document processing application. And indeed, the initial document need not even be "produced" per se; for instance, the functionality described herein can be used to convert a document that is completely blank or a document that contains completely random information into a format expected by a current version of a document processing application. Due to the liberal interpretation of the term "upgrade," the term "version" should also be understood to have broad connotation as used herein. The term "version" generally refers to any class or kind of document.

The above-noted flexibility of the data processing application highlights one of its principal merits. The data processing application can transform an arbitrary structured document (e.g., a markup language document) so that it conforms to the processing requirements of a current version of a data processing application. In this sense, in one implementation, the data processing application uses a transformation mechanism that is stateless. It is stateless in the sense that it does not require prior knowledge or consideration of the kind of documents that are fed into it.

The above-described property and additional features of the data processing application will be explained in the following disclosure. This disclosure is organized as follows. Section A of this disclosure describes an exemplary design strategy used by a data processing application that includes upgrade functionality. Section B describes an exemplary implementation of the design strategy discussed in Section A. Section C describes an exemplary method of operation of the implementation described in Section B. And Section D describes an exemplary computing environment that can be used to provide the implementation described in Section B.

A. Exemplary Design Strategy

Overview of Exemplary Data Processing Application

Figure 2:
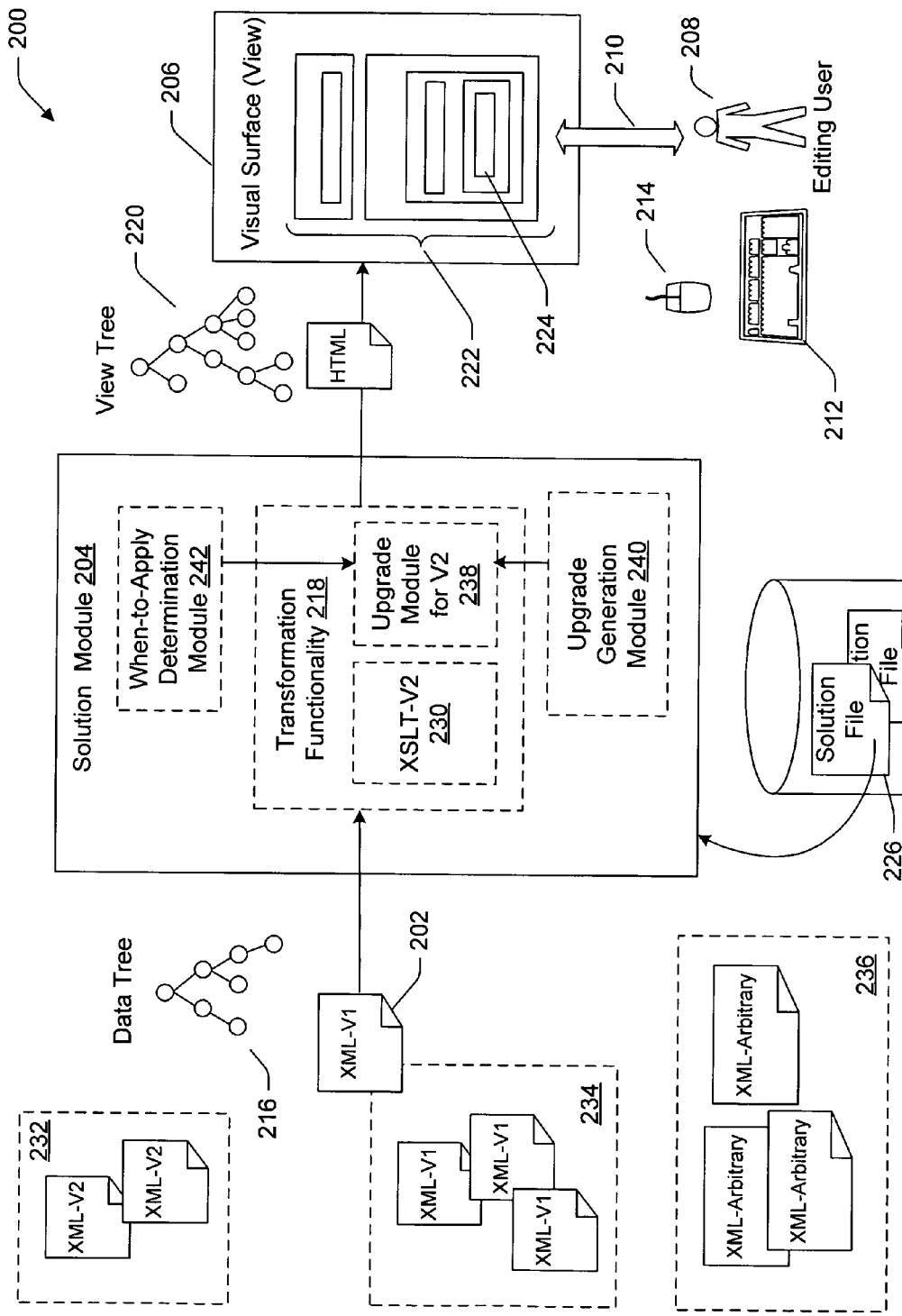
FIG. 2 shows a data processing application including functionality for upgrading arbitrary markup language documents so that these documents are compatible with a current version of the data processing application.

FIG. 2 shows an overview of a data processing application 200 for rendering and editing structured documents. To provide a concrete framework for discussion, the upgrading of structured documents is described in the context of the data processing application 200 shown in FIG. 2. However, the upgrading mechanism can be implemented in many different kinds of systems and environments besides the data processing application 200 shown in FIG. 2. Prior to describing the upgrading mechanism itself, the following section describes various features of the data processing application 200.

By way of overview, the data processing application 200 processes structured data 202 expressed in a markup language, transforms this structured data 202 using a solution module 204 to produce transformed information, and presents a rendering of a visual surface 206 on an output device based on the transformed information. An editing user 208 interacts with the visual surface 206, as indicated by arrow 210, using, for instance keyboard 212, mouse device 214, or some other input device. The visual surface 206 can constitute the presentation of a form having data entry fields associated with the structured data 202. In this case, the editing user 208's interaction can involve filling information into the entry fields of the form, such as by entering information into various text boxes, check boxes, etc.

Each of the above-described principal features—structured data 202, solution module 204, and visual surface 206—will be described in greater detail below.

To begin with, the structured data 202 can be represented in the Extensible Markup Language (XML). XML is a subset of the Standard Generalized Markup Language (SGML) that enables developers to create customized tags that describe the meaning of data, as opposed to the presentation of data. An XML document is composed of XML elements, each of which includes a start tag (such as <author>), an end tag (such as </author>), and information between the two tags (which is referred to as the content of the elements). An element may include any number (including zero) of name-value pairs (referred to as attributes) related by an equal sign that modifies certain features of the element (such as MONTH="May"). As shown in FIG. 2, the elements in an XML document have a hierarchical relationship to each other that can be represented as a data tree 216. The elements in the data tree 216 are also commonly referred to as "nodes." A so-called XML schema (not illustrated in FIG. 2) provides a formal specification that defines the types of elements and the organization of elements that should appear in an XML document in order for that document to be considered so-called well formed.

The solution module 204 includes transformation functionality 218. The purpose of the transformation functionality 218 is to transform the structured data 202 into the visual surface 206. The transformation functionality 218 can perform this task using so-called style sheets, such as style sheets provided by Extensible Stylesheet Language Transformation (XSLT). XSLT transforms the XML data into a format appropriate for presentation, such as the Hypertext Markup Language (HTML), Extensible Hypertext Markup Language (XHTML), Dynamic HTML (DHTML), etc. In other words, documents expressed in XML include tags that are particularly tailored to convey the meaning of the data in the documents. The XSLT conversion converts the XML documents into another markup language in which the tags pertain to the visual presentation of the information contained in the documents. (To facilitate discussion, the following description assumes the use of HTML to render the documents; however, other presentation-oriented markup languages can be used to render the documents.) Because HTML is a markup language, it can be conceptualized as a view tree 220 that includes a hierarchical organization of nodes, as in the case of data tree 216. The reader is referred to the World Wide Web Consortium's (W3C) specifications for background information regarding XML and XSL.

Nodes in the view tree 220 can be mapped (i.e., associated) to corresponding nodes in the data tree 216. Further, nodes in the data tree 216 can be mapped to corresponding nodes in the view tree 220. The mapping of nodes in the view tree 220 to nodes in the data tree 216 allows the solution module 204 to correlate editing operations performed on the visual surface 206 to corresponding nodes in an XML document. This allows the solution module 204 to store information entered by the editing user 208 into the XML document during an editing session. Additional information regarding the mapping functionality of the data processing application 200 can be found in the commonly assigned U.S. patent application entitled, "Mapping Between Structured Data and a Visual Surface," filed on the same day as the present application, which names Prakash Sikchi, Evgeny N. Veselov, and Stephen J. Mooney as inventors.

Figure 7:
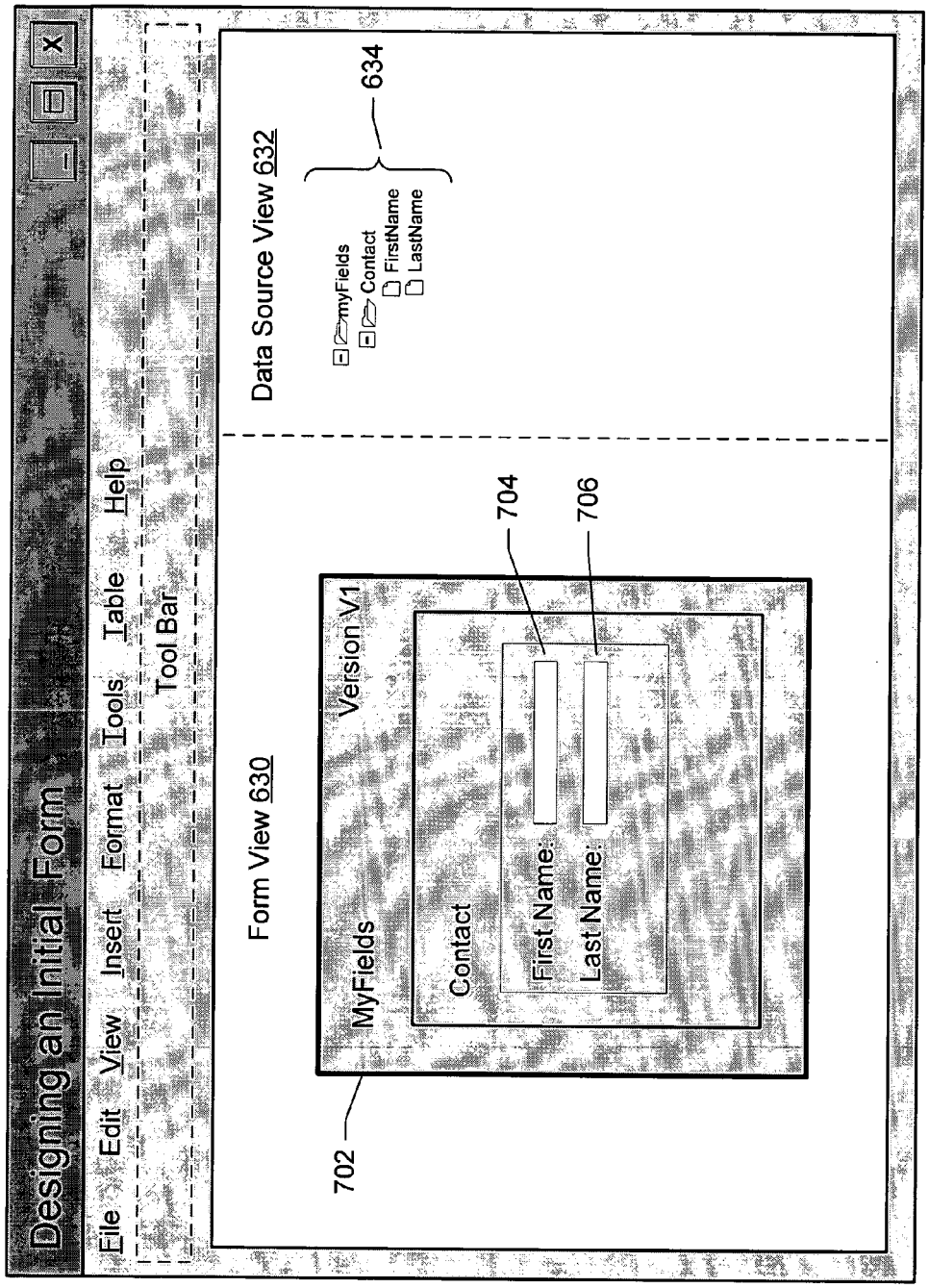
FIG. 7 shows an exemplary user interface (UI) window for designing an electronic form.
Figure 8:
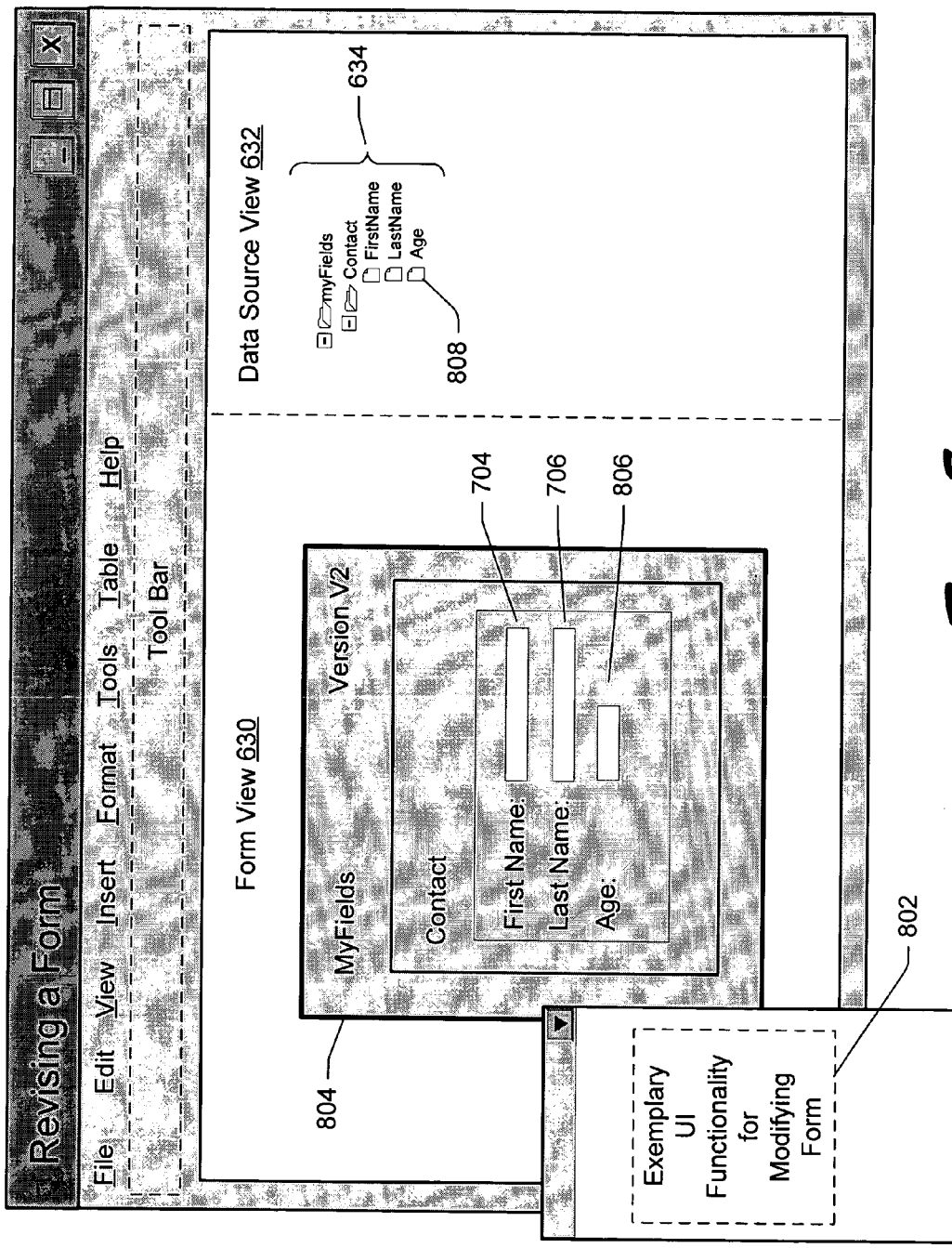
FIG. 8 shows another user interface window for modifying the electronic form created using the user interface window shown in FIG. 7.

The visual surface 206 itself has an appearance that is determined by both the information contained in the structured data 202 as well as the effects of the XSLT transformation provided by the transformation functionality 218. Generally, in the case of electronic forms, the visual surface 206 typically includes a hierarchical structure which is related to the hierarchical structure in the structured data 202. For instance, an exemplary electronic form 222 includes multiple sections pertaining to different topics that reflect the topics in the structured data 202. (However, it is not necessary to have a one-to-one direct correspondence between the organization of the structured data 202 and the organization of the visual surface 206; in other words, the transformation of the structured data 202 to the visual surface 206 is generally considered non-isomorphic). Each section in the exemplary electronic form 222 can include one or more data entry fields for received input from the editing user 208, such as data entry field 224. The data entry fields are also referred to herein as "editing controls." Different graphical components can be used to implement the editing controls, including text boxes, drop-down list boxes, lists boxes, option buttons (also referred to as radio buttons), check boxes, and so on. FIGS. 7 and 8, to be described in turn, provide an example of the visual appearance of an electronic form as it is being designed and modified, respectively.

The functionality of the solution module 204 is defined, in part, by a solution file, such as exemplary solution file 226 stored in storage 228. The solution file 226 essentially constitutes an electronic form template, providing all of the semantic information required to transform the structured data 202 into the visual surface 206. Different XML documents may have been created by, or otherwise refer to, different electronic form templates. Accordingly, different XML documents may have different solution files associated therewith. Various techniques can be used to retrieve a solution file that is associated with a particular XML document. For instance, an appropriate solution file can be retrieved based on URN (Uniform Resource Name) or URL (Uniform Resource Locator) information contained in the header of an input XML document. That header information links the input document to a corresponding solution file.

Figure 3:
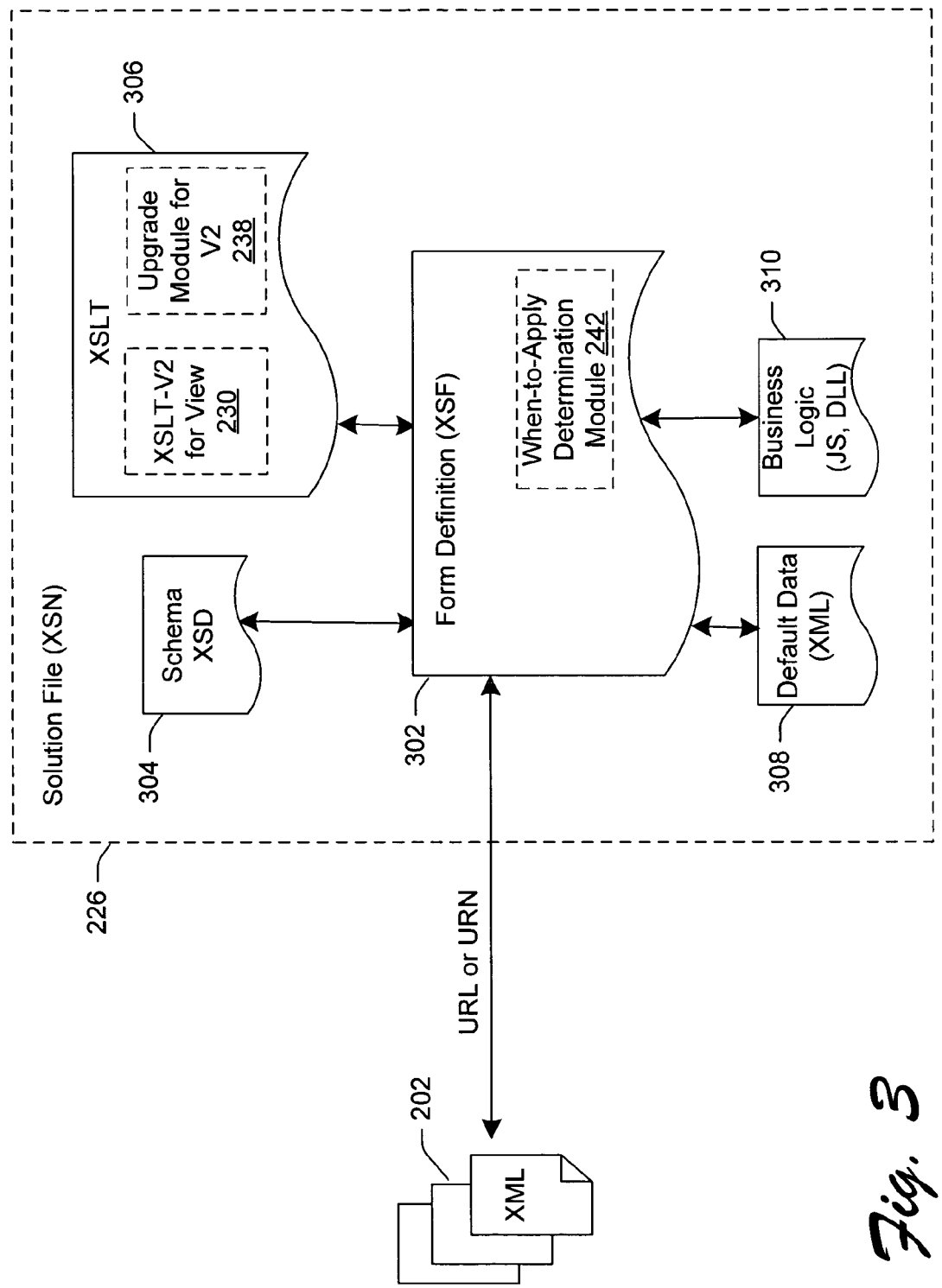
FIG. 3 shows an exemplary architecture of a solution file used, in part, to configure a solution module shown in FIG. 2.

Jumping ahead briefly in the sequence of figures, FIG. 3 shows an exemplary organization of the solution file 226. The solution file 226 itself can include a collection of files (302, 304, 306, 308, and 310) that together provide all of the semantic information required to transform the structured data 202 into the visual surface 206. This collection of files can be packaged together. In one exemplary implementation, this collection of files is referred to using an extension .xsn. A form definition file 302, also called a manifest file, forms the centerpiece of the collection. The form definition file 302 contains information about all of the other files in the solution module 204. This file 302 is assigned the exemplary extension .xsf. A schema file 304 is used to constrain and validate the structured data 302. This file is assigned the exemplary extension .xsd. View files 306 provide presentation logic files that are used to present, view, and transform the structured data 302. These files therefore implement the transformation functionality 218 discussed in connection with FIG. 2. The view files 306 can include multiple files corresponding to multiple possible views (i.e., visual surfaces 206) that the user 208 can select from. The view files 306 are assigned the exemplary extension .xsl. A default data file 308 contains default data that can be displayed in a view for fields that have not been explicitly defined by the user 208. This file 308 is assigned the exemplary extension .xml. Finally, business logic files 310 provide programming code used to implement specific editing behavior, data validation, event handlers, control of data flow, and other features. Such programs can be written in any kind of language, such as the scripting language provided by Microsoft JScript® or VBScript. In this case, these files are assigned the exemplary extensions .js or .vb (for JScript and VBScript, respectively).

With the above introduction, the focus will now turn to the mechanism provided in the data processing application 200 for upgrading documents.

Overview of Upgrade Strategy

Returning to FIG. 2, when the solution module 204 that produces the electronic form 222 was initially created, the design functionality provided by the data processing application 200 would have generated an XSLT file that implemented the necessary mapping between the structured data 202 and the visual surface 206. This XSLT file is referred to as XSLT-V1. Subsequently, assume that a designing user modified the electronic form 222 and associated solution module 204 in a significant way, such as by deleting data entry fields, adding data entry fields, and so on. Such a change would have the effect of also modifying the schema 304 on which the underlying structured data 202 is based. Accordingly, such a change might warrant changing both the schema 304 associated with the solution module 204 and the XSLT files associated with the solution module 204. As explained above, the schema 304 provides information regarding the general organization and content of structured data 202 as expected by the solution module 204, while the XSLT files provide information regarding how to map the structured data 202 into a desired visual presentation. FIG. 2 specifically illustrates the inclusion of a second version of the XSLT files (i.e., XSLT-V2 230) to handle the above identified change in the electronic form 222.

FIG. 2 shows exemplary documents that can be processed using the version V2 of the solution module 204 (that uses XSLT-V2 230). A first group of documents 232 pertain to documents created using the current version (V2) of the solution module 204. Hence, these documents are referred to as XML-V2 documents (where the suffix V2 indicates that they were created using version V2 of the solution module 204). A second group of documents 234 pertain to documents created using the first version (V1) of the solution module 204. Hence, these documents are referred to as XML-V1 documents. But as noted above, the solution module 204 is not limited to processing documents that were generated by some version of the solution module 204. The solution module 204 can process any kind of documents, including, in extreme cases, a document produced by an application having virtually no relationship to the solution module 204 and the corresponding electronic form 222. Or indeed, a completely blank document or document containing random nodes can be effectively processed by the solution module 204. A group of documents 236 labeled "XML-arbitrary" is included in FIG. 2 to highlight the ability of the data processing application 200 to process completely arbitrary input documents. For the purposes of illustration, FIG. 2 shows that the particular structured data 202 corresponds to an XML-V1 document produced by a first version of the solution module 204.

An upgrade module 238 allows the solution module 204 to transform the XML-V1 structured data 202 into a format compatible with version V2 of the solution module By way of overview, the upgrade module 238 performs this task by modifying the XML-V1 structured data 202 so that it conforms to the expectations of the V2 solution module 204. Such "expectations" may pertain to schema-type expectations that are specified in the schema 304 of the solution module 204. Other "expectations" may pertain to aspects which are considered important to the visual appearance and/or behavior of the V2 version of the electronic form 222, but might not be dictated by the schema 304 of the solution module 204. The upgrade module 238 is shown as being encompassed by the transformation functionality 218 because it can be implemented as an XSL transformation file. Namely, the upgrade module 238 works by transforming the XML-V1 structured data 202 into another XML document that is compatible with the V2 version of the solution module 204.

An upgrade generation module 240 performs the task of generating the upgrade module 238. The upgrade generation module 240 can be triggered to perform this task when the designing user makes a significant change to the electronic form 222. This will prompt the design aspects of the data processing application 200 to generate an XSL file that will convert an input arbitrary XML document into an XML document that is compatible with the expectations of the new version of the solution module 204. In another implementation, the upgrade generation module 240 can generate the upgrade module 238 automatically in any editing circumstance, that is, regardless of the assessed significance of the change.

Finally, an optional "when-to-upgrade" module 242 determines when to apply the upgrade module 238. The when-to-upgrade module 242 may specify that the upgrade module 238 is to be applied to only documents applied to a range of versions, such as versions 2.0 to 3.3, etc. Information regarding the version of an input document can be gleaned from header information contained in the XML document. This module 242 is optional, however, in the sense that the solution module 204 has the capability of processing any structured document produced by any version of any application, and therefore does not require prior knowledge of the version of the input document.

Advancing to FIG. 3 once again, this figure shows that the upgrade module 238 can be implemented as an XSLT file 306. The XSLT file 306 also includes the XSLT-V2 230 that implements the transformation of the structured data 202 into the visual surface 206. The when-to-apply module 242 can be implemented as part of the form definition files 302. This implementation is exemplary; other data processing applications can implement the upgrading mechanism in different ways than is shown in FIGS. 2 and 3.

Figure 4:
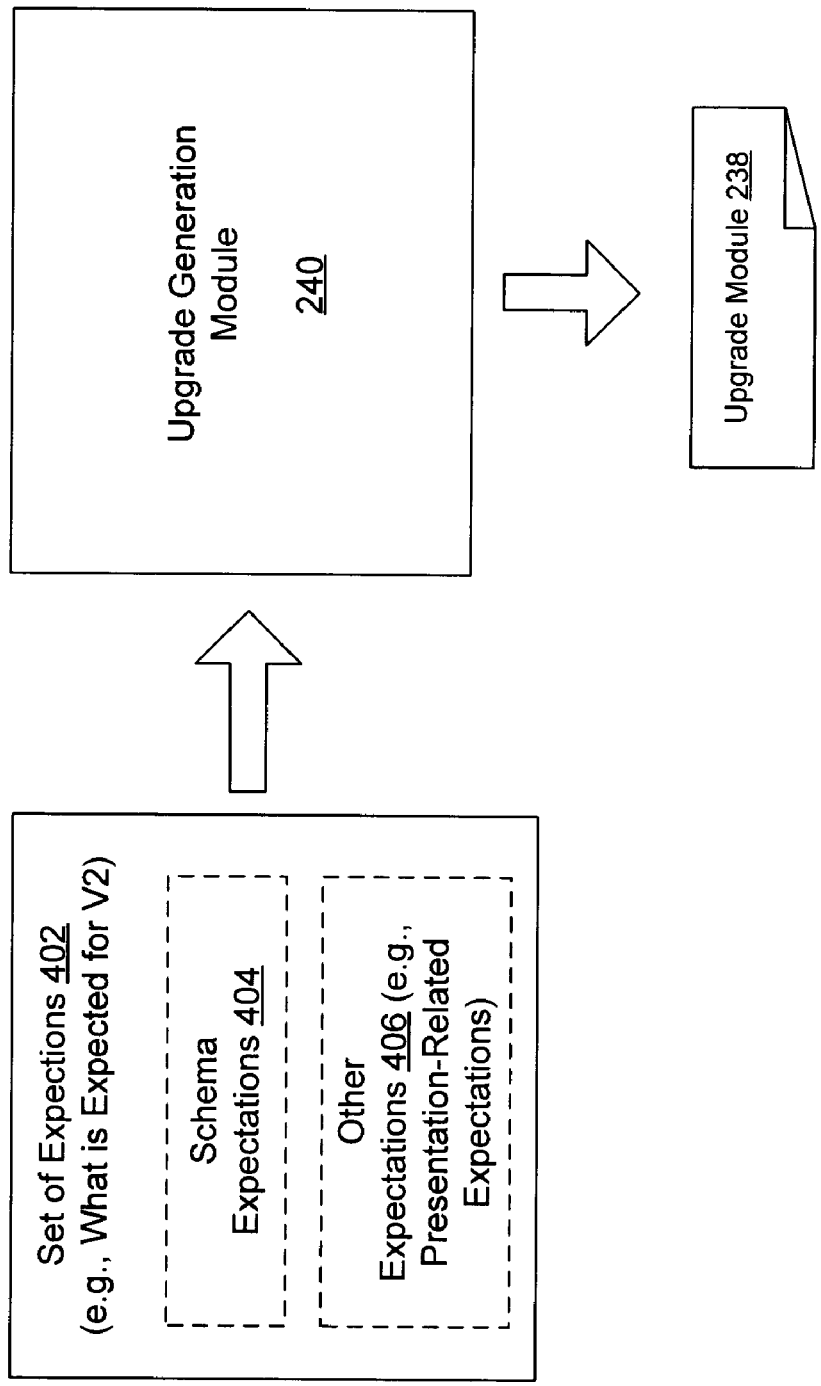
FIG. 4 shows an upgrade generation module used in the data processing I application of FIG. 2 to generate an upgrade module.

FIG. 4 illustrates the logic underlying the upgrade generation module 240. As noted above, the upgrade generation module 240 generates the upgrade module 238 in response to the changed expectations of the solution module 204. A set of expectations 402 in FIG. 4 reflects this concept. As noted above, these expectations 402 can be grouped into two categories. Schema expectations 404 refer to expectations that are dictated by the schema 304 of the new version of the form 222. Other expectations 406 pertain to features of the electronic form 222 that are considered important to the designing user, but are not necessarily dictated by the schema 304. Additional details regarding the second category 406 of expectations will be described shortly. In another implementation, the upgrade generation module 240 can generate the upgrade module 238 in all circumstances.

Figure 5:
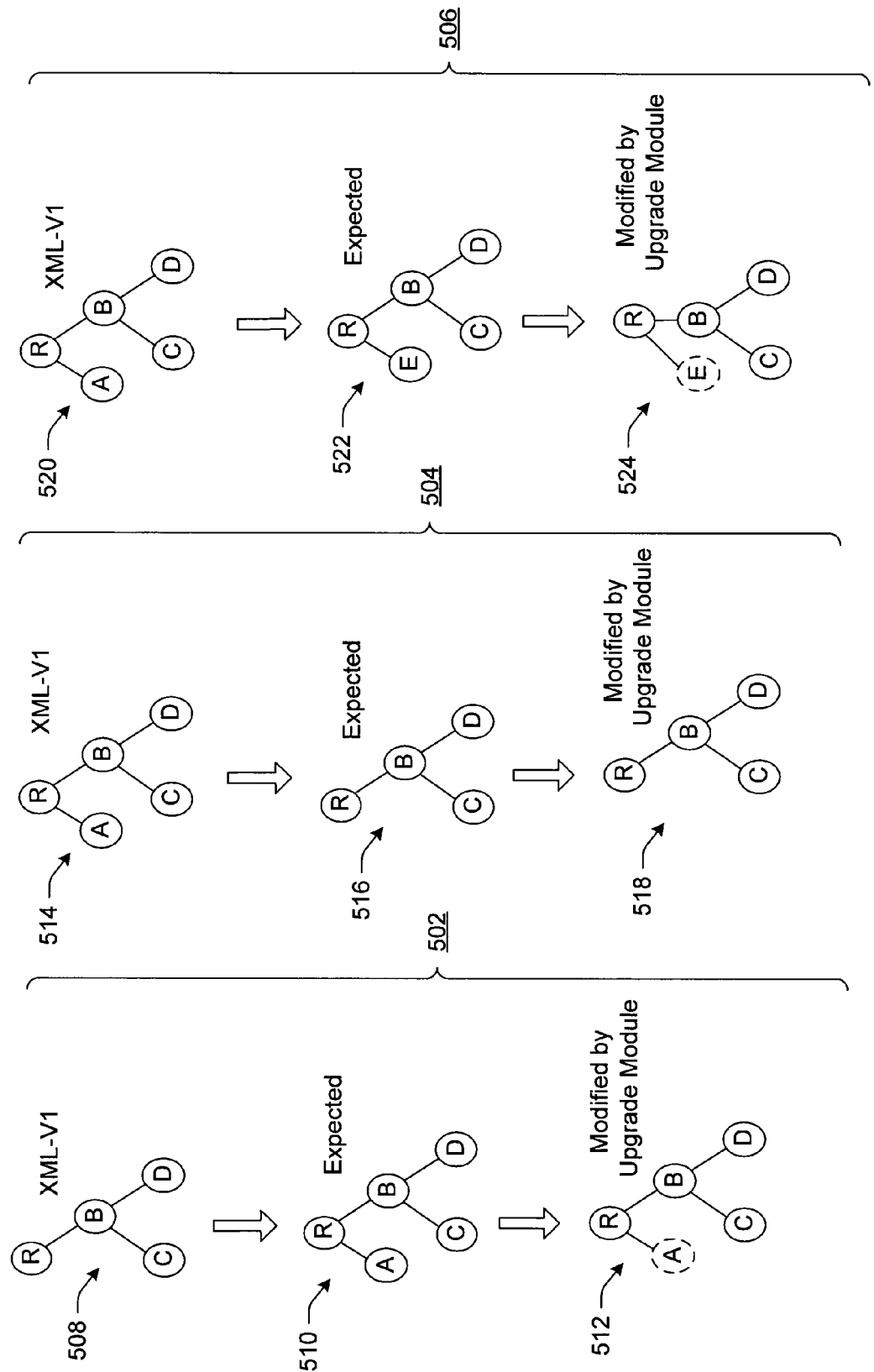
FIG. 5 shows three exemplary scenarios involving the upgrading of documents.

FIG. 5 shows three different scenarios (502, 504, 506) that illustrate the operation of the upgrade module 238. All three of these scenarios (502, 504, 506) reflect changes made to an input XML document to accommodate expectations specified by the schema 304 of the solution module 204. Once again, the schema 304 specifies the structure of the XML document that the solution module 204 is expecting to receive and process to create the electronic form 222.

To begin with, scenario 502 shows the case where the input document 508 represents a document produced by a first version of the solution module 204, and is therefore labeled XML-V1. XML-V1 508 includes a series of nodes that reflect information contained in the document, including nodes R (i.e., signifying the root), B, C, and D. Schema 510 reflects the schema expectations of the version V2 of the solution module 204. The schema 510 corresponds to the nodes in XML-V1 508, except that a new node A has been added. This new node may reflect a new data entry field added to the electronic form 222 by the designing user. In other words, the new node may reflect a new piece of information that is being collected by the electronic form 222. The upgrade module 238 comes into play by creating a new XML document 512 containing created nodes that reflect the expectations of version V2 of the solution module 204. In the new document 512, the contents of nodes R, B, C, and D are copied from the source document XML-V1 508 into the new document 512. In addition, the upgrade module 238 creates new node A, and may assign a default value to this node.

Scenario 504 represents the case where the document XML-V1 514 contains nodes R, A, B, C, and D, but the schema 516 of version V2 of the solution module 204 omits node A. This change may indicate that the designing user has subsequently modified the electronic form 222 to delete a data entry field. This change indicates that a piece of information is no longer being collection via the electronic form 222. In this situation, the upgrade module 238 comes into play by creating a new XML document 518 that contains nodes R, B, C, and D having content copied from the same-named nodes in document XML-V1 514, but that fails to create node A (because this node is not specified in the schema 516), and thus effectively deletes node A from the input document XML-V1 514.

Scenario 506 describes the case where the input document XML-V1 520 again includes nodes R, A, B, C, and D. In this case, however, the designing user has renamed node A as node E, and this is reflected in the schema 522. This might correspond to the case where the designing user has renamed a data entry field in the electronic form 222. For example, the designing user might have changed the name of a text entry field from "automobile" to "car," etc. The upgrade module 238 addresses this case by creating nodes R, B, C, and D having content copied from the same-named nodes in the document XML-V1 520. This yields XML document 524. However, because it does not find node A in the schema 522, the upgrade module 238 does not create this node, and thus effectively deletes it. On the other hand, the upgrade module 238 sees the new node E in the schema 522, and thus adds node E to the transformed XML document 524. This is merely one way to handle the case where nodes are renamed.

In other cases, the upgrade module 204 can incorporate functionality having the necessary intelligence to detect that a node in the input XML document reflects an identical node in the schema which has been simply renamed (that is, without having to execute the above-described deleting/adding procedure). For example, the structure of an input document can be compared with the structure of a document expected by a current version of an application (e.g., as reflected by the schema associated with the current version). The comparison may reveal a close match between a collection of nodes in the input document and a collection of nodes in the expected structure. The comparison may further reveal a positional correspondence between unmatched nodes in the input document and unmatched nodes in the expected structure. In this circumstance, there is a significant probability that these positionally related unmatched nodes reflect nodes that have simply been renamed. A rule can therefore be fashioned to detect the above-noted pattern and interpret it as a node rename. More generally, other kinds of analysis strategies may be used to detect other commonly encountered conversion pattern scenarios. These strategies can generally rely on positional and inferential analysis of node structure and content, as well as a wide variety of other analysis techniques. Some strategies can be fashioned to reflect common patterns and rules found in particular document processing environments. In another implementation, it is also possible to modify the upgrade module 238 such that it is based on some knowledge of the schema of the input XSL-V1 document; however, this solution to the problem has the drawback of making the upgrade module 238 no longer stateless.

The scenarios (502, 504, 506) shown in FIG. 5 are highly simplified examples of the transformation functionality provided by the upgrade module 238. In actual cases, the leaf nodes shown in the trees would likely contain a series of child nodes, which, in turn, might include other respective series of child nodes. In this case, the algorithm described in FIG. 5 is performed recursively to process all of these child nodes. Basically, nodes that are expected by version V2 of the solution module 204, but are missing in the structured data 202, are added by the upgrade module 238, and nodes that are not expected by version V2 of the solution module 204, yet are contained in the structured data 202, are essentially deleted.

The upgrade module 238 can perform other kinds of transformations besides adding and deleting nodes. Some of these other transformations may reflect the dictates of the schema 304 associated with version V2 of the solution module 204.

Other transformations may not reflect the dictates of the schema 304; for instance, these other transformations may pertain to visual or behavioral features of the electronic form 222 that the designing user would like duplicated in earlier versions (e.g., V1) of the form 222's documents.

For instance, version V1 of the electronic form 222 might have specified that a certain data entry field was optional. The schema corresponding to version V would therefore contain information indicating that a node corresponding to this data entry field was optional. As a result of this optional status, some XML documents produced by version V1 may contain this optional node, while others may not. A subsequent second version V2 of the electronic form 222 might have modified the electronic form 222 to make the optional data entry field mandatory. However, this change might not have been propagated to a corresponding change in the schema file 304. As such, the V2 version of the solution module 204 can still "legally" process documents produced by version V1 of the electronic form 222 that lack the optional node, as these documents still conform to the schema (where this node is indicated as optional). This, however, might result various problems with the visual presentation of the electronic form 222. To prevent this from happening, the upgrade module 238 can also modify an input XML document such that it is conformant with the optional status of various nodes specified in the V2 version of the solution module 204, but not necessarily dictated by the schema 304 of the V2 version of the solution module 204.

In another example, the V2 version of the solution module 204 can capture information regarding the minimum and/or maximum number of nodes of a particular kind that is expected by the V2 version. This numeric information is referred to as cardinality information. In this case, the upgrade module 238 can be used to enforce this expectation by modifying an input document so that it conforms to the cardinality expectations of the V2 version of the solution module 204.

In another example, the V2 version of the solution module 204 can capture information regarding default values associated with nodes that are expected by the V2 version. In this case, the upgrade module 238 can be used to supply or modify default values in an input document so that this document conforms to the default value expectations of the V2 version of the solution module 204.

In another example, the V2 version of the solution module 204 might specify that certain data entry fields must contain a value—namely, that these data entry field values are mandatory. In this case, the upgrade module 238 can be used to modify the mandatory status of values associated with nodes in the input document so that this document conforms with the mandatory status expectations of the V2 version of the solution module 204.

In another example, the V2 version of the solution module 204 might specify that certain formatting applies data entry fields, such as rich text formatting. Rich text formatting requires the capture of formatting information using a data structure. In this case, the upgrade module 238 can be used to modify the formatting of the input document so that it conforms with selected formatting expectations of the V2 version of the solution module 204. However, in general, changes in formatting are considered relatively minor. Hence, many formatting changes are not "enforced" by the upgrade module 238.

The above-identified expectations are merely illustrative. Different business environments may warrant the use of the upgrade module 238 to enforce a different collection of expectations.

B. Exemplary Apparatus for Implementing Upgrade Technique

Figure 6:
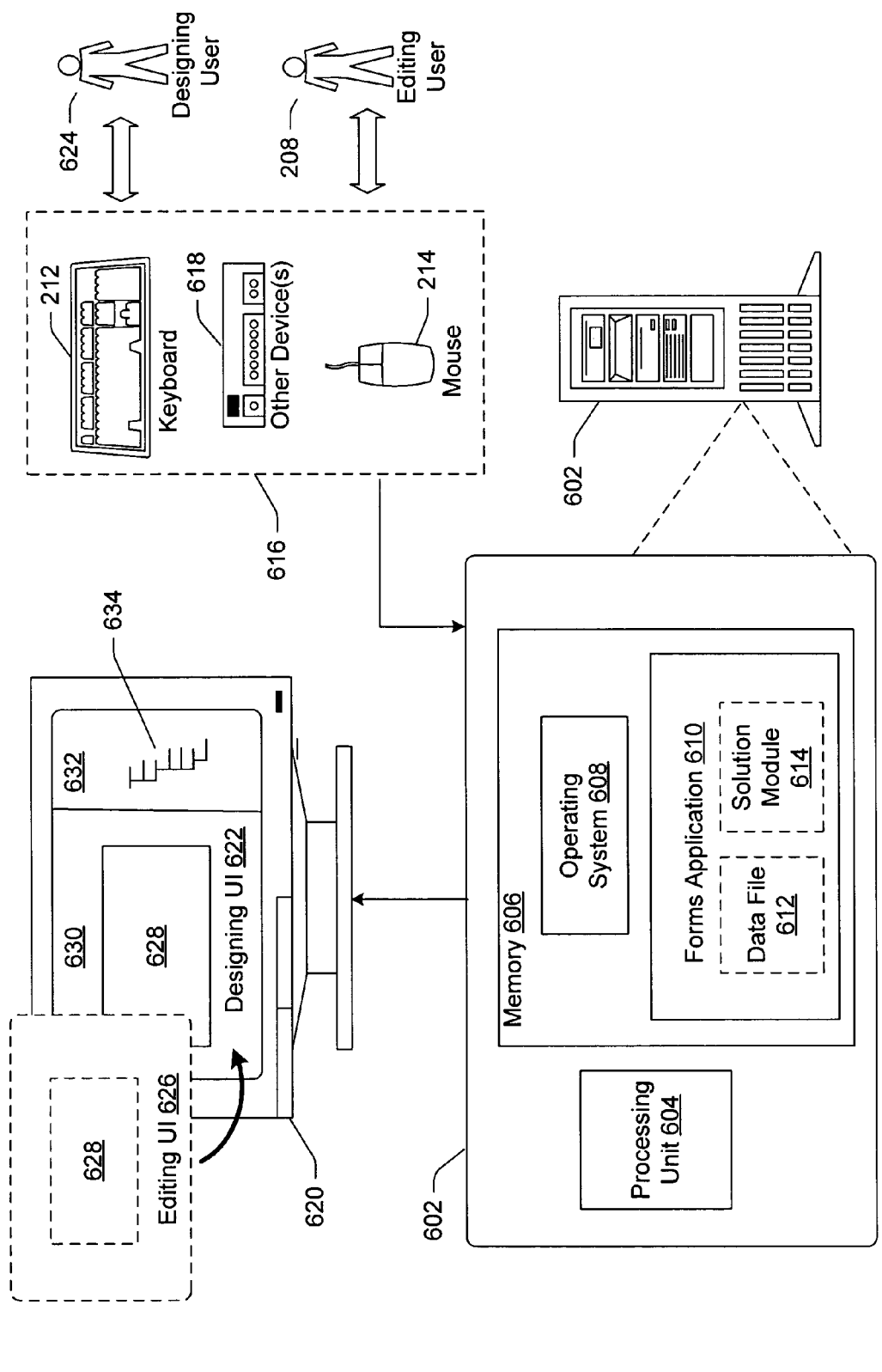
FIG. 6 shows an exemplary apparatus for implementing the data processing application shown in FIG. 2.

FIG. 6 shows an overview of an exemplary apparatus 600 for implementing the data processing application 200 shown in FIG. 1. The apparatus 600 includes a computer 602 that contains one or more processing units 604 and memory 606. Among other information, the memory 606 can store an operating system 608 and the above-described data processing application 200, identified in FIG. 6 as a forms application 610. The forms application 610 can include data files 612 for storing the structured XML data 202, and solution module(s) 614. As noted above, a solution module 614 comprises logic that specifies the appearance and behavior of the visual surface 206 (as was described in connection with FIG. 2). The logic provided by solution module 614 is, in turn, determined, in part, by a solution file (such as a solution file 226 composed of the files shown in FIG. 3). The computer 602 is coupled to a collection of input devices 616, including the keyboard 212, mouse device 214, as well as other input devices 618. The computer 602 is also coupled to a display device 620.

In one exemplary implementation, the forms application 610 includes a design mode and an editing mode. The design mode presents design UI 622 on the display device 620 for interaction with a designing user 624. The editing mode presents editing UI 626 on the display device 620 for interaction with the editing user 208. In the design mode, the forms application 610 creates an electronic form 628, or modifies the structure of the electronic form 628 in a way that affects its basic schema. In other words, the design operation produces the solution module 614 that furnishes the electronic form 628. In the editing mode, the editing user 208 uses the electronic form 628 for its intended purpose—that is, by entering information into the electronic form 628 for a business-related purpose or other purpose.

In the design mode, the forms application 610 can be configured to depict the electronic form 628 under development using a split-screen display technique. More specifically, a forms view portion 630 of the design UI 622 is devoted to a depiction of the normal appearance of the electronic form 628. A data source view portion 632 of the visual surface is devoted to displaying a hierarchical tree 634 that conveys the organization of data fields in the electronic form 628.

FIG. 7 shows design UI that illustrates the allocation of the visual surface 206 into the forms view portion 630 and the data source view portion 632. As described above, the forms view portion 630 contains a depiction of the normal appearance of the form 628—in this case, exemplary form 702. The form 702 includes a plurality of text box entry fields (e.g., fields 704 and 706). Field 704 is labeled First Name; it allows for entry of an individual's first name. Field 706 is labeled Last Name; it allows for entry of an individual's family name. The data source view portion 632 includes the hierarchical tree 634 showing the nested layout of the text fields (704 and 706) presented in the form 702.

The forms application 610 offers multiple techniques for creating the electronic form 702. According to one technique, the electronic form 702 can be created from scratch by building the electronic form 702 from successively selected editing controls. The exemplary electronic form 702 shown in FIG. 7 is entirely constructed using the text entry boxes (704 and 706), but other electronic forms can include other kinds of entry fields (i.e., editing controls), such as drop-down list boxes, list boxes, option button, check boxes, and so on.

Once a form has been created, its design (and associated schema) can be further modified. FIG. 8 shows one exemplary technique for performing this operation. In this technique, the designing user 624 can activate UI functionality 802. This functionality 802 allows the designing user 624 to modify the electronic form 702 that was previously created (in FIG. 7), to thereby produce new electronic form 804. There are a myriad of ways that the designing user 624 can decide to modify a prior electronic form, such as by adding data entry fields, deleting existing data entry fields, renaming data entry fields, changing the type of editing control assigned to the data entry fields, changing the layout of data entry fields or other features of the electronic form, or making changes to other properties of the electronic form. In the exemplary case shown in FIG. 8, the designing user 624 has decided to add a new data entry field 806 to the electronic form 804 (for entering an individual's age). If the designing user 624 makes changes to the form view portion 630, then corresponding changes will be reflected in the data source view 632. In the present scenario, this is reflected by the introduction of the additional node 808 in the data source view 632.

The changes illustrated in FIG. 8 will warrant making a change to the schema 304 of the solution module 204 associated with this form 804. These changes will also warrant making changes to the XSLT used to create the visual appearance of the electronic form 804. But other changes made to the form 804 might not require modification of the schema 304, as noted in Section A of this disclosure.

In summary, form 702 shown in FIG. 7 can be referred to as version V1 having a corresponding V1 solution module 204. Form 804 shown in FIG. 8 can be referred to as version V2 having a corresponding V2 solution module 204. Accordingly, documents created using the electronic form 702 can be called XML-V1 documents. Documents created using the electronic form 804 can be called XML-V2 documents. By virtue of the changes shown in FIG. 8, the forms application 610 also produces an upgrade module The upgrade module 238 is specifically adapted to transform an arbitrary XML document into an XML document that conforms to expectations associated with electronic form 804 and its corresponding V2 solution module 204.

More specifically, suppose that the editing user 208 makes a request to display and/or edit a particular XML-V1 document. In one implementation, this would prompt the forms application 610 to locate the solution module 204 corresponding to the version V2 of the solution module 204, as this is the most current version. More specifically, the XML-V1 document contains information that identifies a particular kind of form in its header. The forms application 610 can be configured to retrieve the most current version of the solution module 204 corresponding to the kind of form identified in the XML-V1 document's header.

Having retrieved the V2 solution module 204, the forms application 610 proceeds to transform the XML-V1 document into an XML document which conforms to the expectations of the V2 solution module 204. The following flow charts provide additional details regarding the operations performed in generating and applying the upgrade module 238.

C. Exemplary Method of Operation

Overview of Procedure

Figure 9:
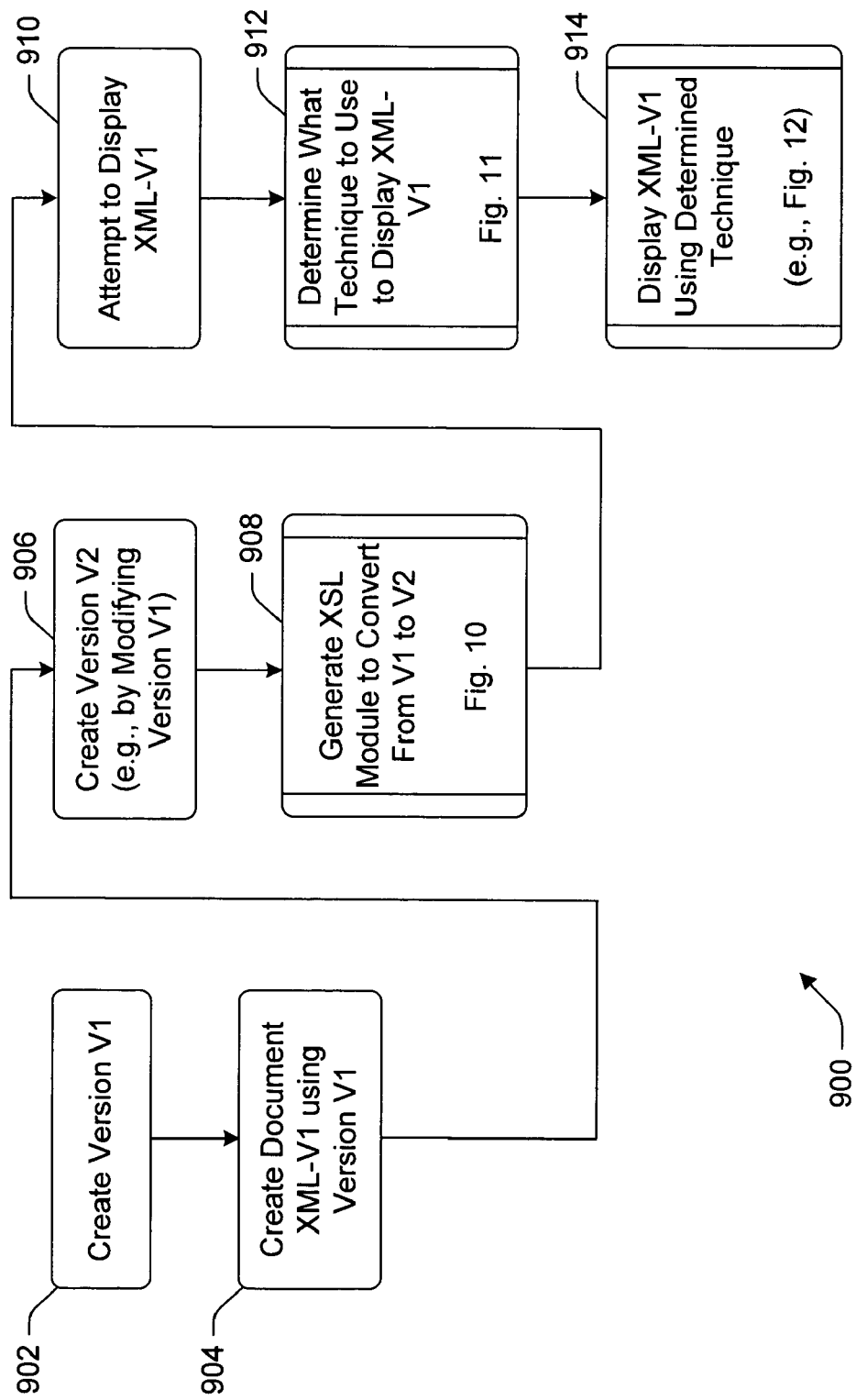
FIG. 9 shows an overview of a procedure used to upgrade documents.

FIG. 9 shows an overview of a procedure 900 for creating and applying the version upgrade module 238. To begin with, step 902 entails creating version V1 of a solution module 204. To provide a concrete example, this step 902 can correspond to the creation of the electronic form 702 shown in FIG. 7, which is accompanied by the creation of a corresponding V1 solution module 204. Step 904 entails creating an XML document using the electronic form 702 and associated V1 solution module 204. Since this document is created with version V1 of the electronic form 702, it is referred to as XML-V1.

Figure 10:
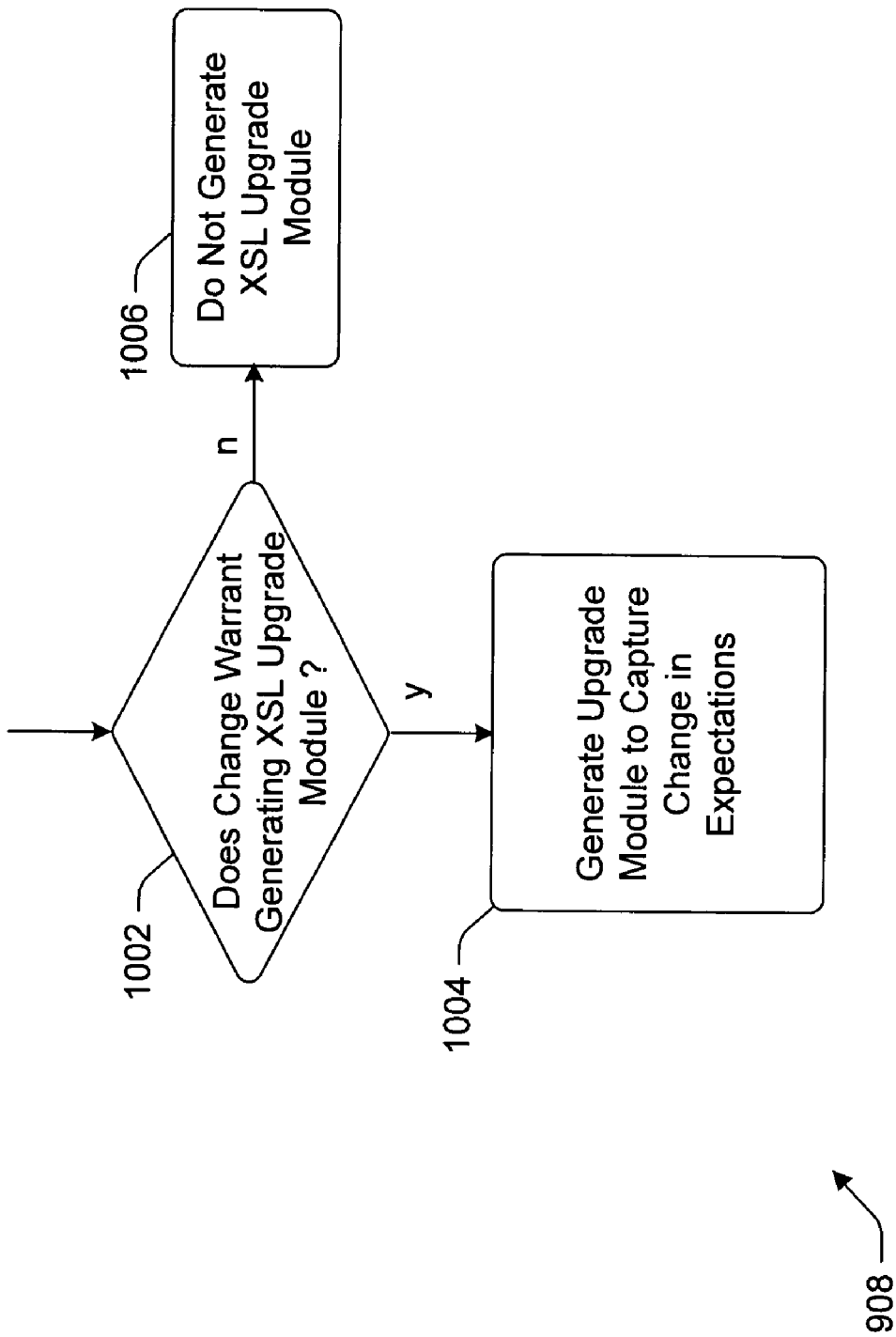
FIGS. 10-12 show additional details regarding the processing steps in the procedure shown in FIG. 9.

In step 906, the designing editing user 624 creates a version V2 of the electronic form, corresponding, in one example, to the electronic form 804 shown in FIG. 8. This step 906 can entail adding data entry fields to the electronic form 702, deleting data entry fields, changing the properties of existing data entry fields (such as changing the optional status of data entry fields), and so on. The changes made by the designing user 624 may be significant or relatively minor. If the changes are deemed significant, then step 908 entails generating an upgrade module 238 associated with the changes. If the changes are deemed relatively minor, the forms application 610 will not generate an upgrade module. As previously described, a significant change in an electronic form may pertain to a change in the form's schema, or may pertain to an important aspect of its visual appearance or behavior that is not necessarily dictated by the schema. A relatively minor change might reflect a small change to the appearance of the form, such as a change in the formatting applied to the form. Generally, the decision of when to generate the upgrade module 238 can be tailored to address the requirements and objectives of a particular business environment. FIG. 10 provides additional details regarding the generation of the upgrade module 238. In another implementation, an upgrade module 238 is generated in all circumstances, e.g., even for relatively minor changes.

Figure 11:
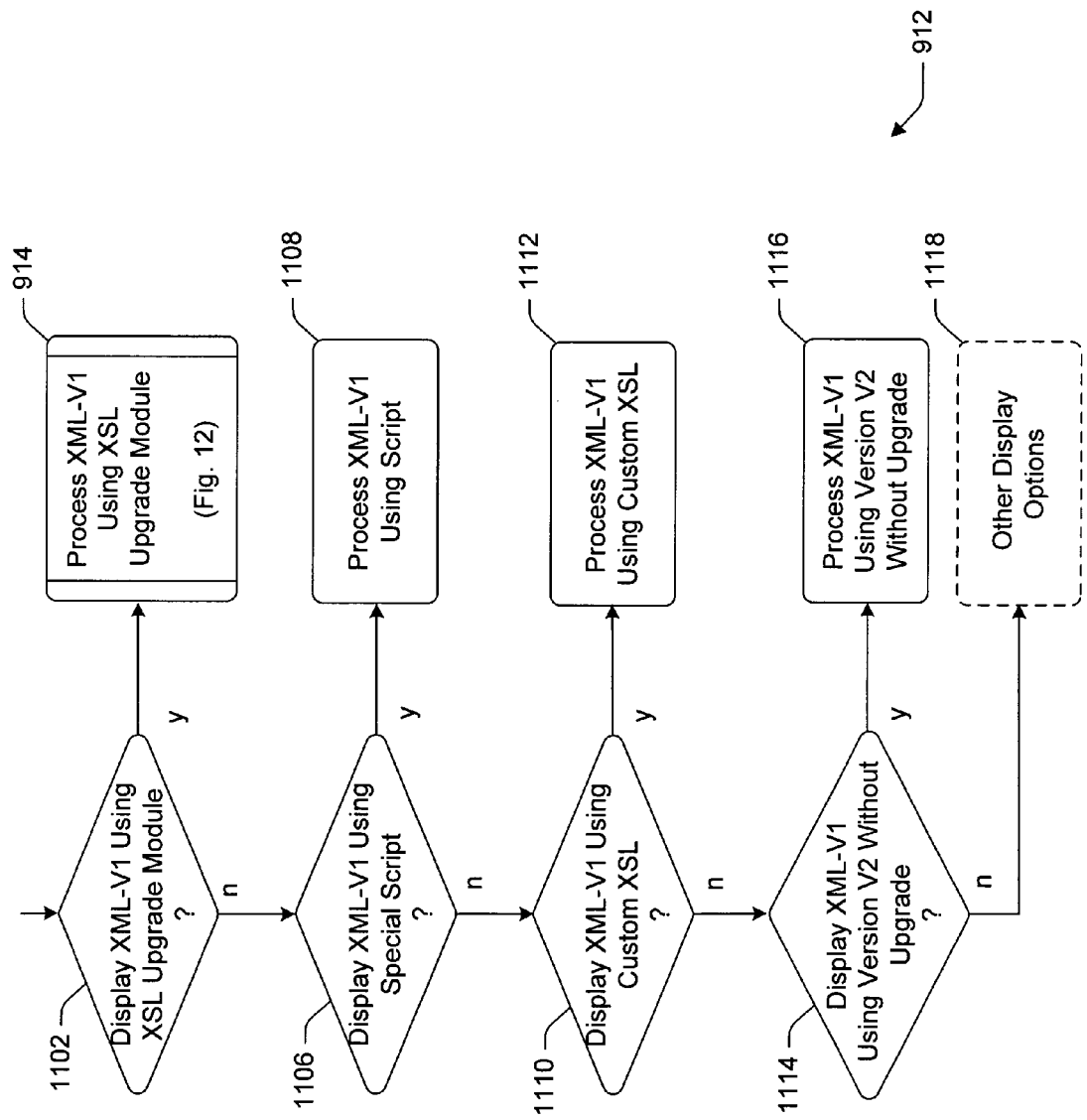

In step 910, the editing user 208 attempts to display the XML-V1 document. In step 912, the forms application 610 determines what technique to use to display the XML-V1 document. In one case, the forms application 610 retrieves the version V2 of the solution module 204 corresponding to form 802 shown in FIG. 8. In another case, the forms application 610 will apply a custom script to display the XML-V1 document, or will use some other technique to render the XML-V1 document. FIG. 11 provides additional details regarding the selection of a technique used to render the XML-V1 document.

Figure 12:
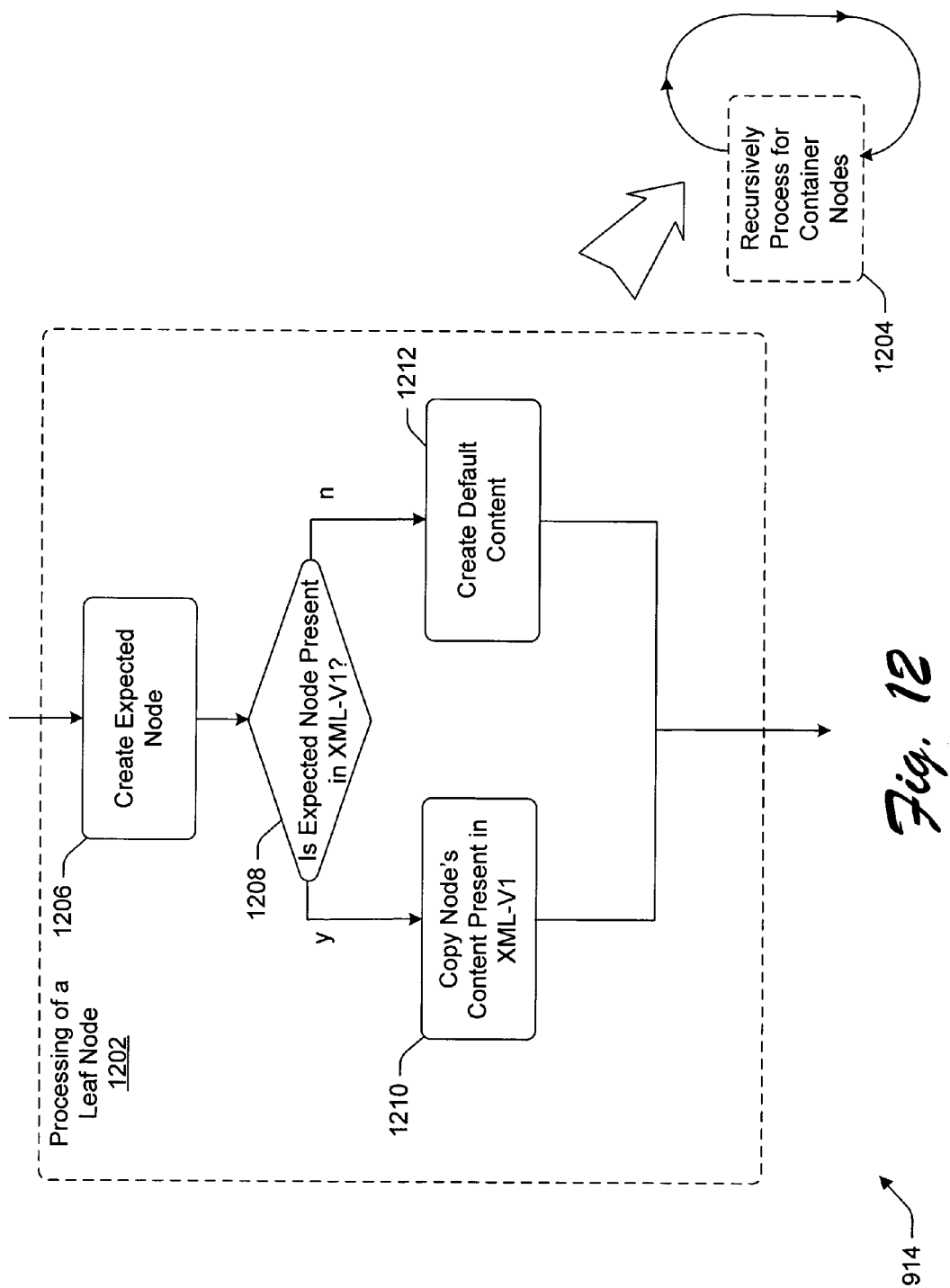

Finally, in step 914, the forms application 610 displays the XML-V1 document using the technique determined in step 912. FIG. 12 provides additional details regarding a procedure used to display the XML-V1 document by applying the upgrade module 238 provided by the V2 solution module 204.

Generation of the Upgrade Module

FIG. 10 shows additional details regarding the procedure 908 used to generate the upgrade module 238 (where procedure 908 corresponds to the step 908 shown in FIG. 9). In step 1002, the forms application 610 determines whether the designing user 624 has made a change to the electronic form (e.g., the electronic form 702) that warrants generating an upgrade module 238. Once again, a change that affects the schema 304 of a solution module 204 would generally warrant the generation of an upgrade module 238. Other changes may trigger the generation of an upgrade module 238 even though they do not affect the schema 304 of the solution module 204. In step 1004, if the changes are deemed significant, then the forms application 610 generates the upgrade module 238. In step 1006, if the changes are deemed to be minor, then no upgrade module 238 is generated. As stated above, this functionality can be omitted from the forms application 610. For instance, the forms application 610 can be configured to generate the upgrade module 238 in all circumstances, or based on some other criteria than that described above.

Selection of Document Processing Technique

FIG. 11 shows additional details regarding the procedure 912 used to select a technique for processing the XML-V1 document (where procedure 912 corresponds to the step 912 shown in FIG. 9).

In step 1102, the forms application 610 determines whether it should display the XML-V1 document using an upgrade module 238 associated with a later version of the electronic form, such as version V2 of the electronic form. More specifically, in one implementation, the XML-V1 document has header information that specifies a solution module 204 that should be used to render the document. In response to a user's request to render the XML-V1 document, the forms application 610 retrieves an appropriate solution module 204 based on the header information in the XML-V1 document. The retrieved solution module 204 contains an upgrade module 238 as well as the when-to-apply module 242. The when-to-apply module 242 determines whether to apply the upgrade module 238 to the input document, such as, in this case, the XML-V1 document. An exemplary excerpt of instructions provided by the when-to-apply module 242 is as follows:

<xsf:documentVersionUpgrade>
<xsf:useTransform transform="upgrade.xsl"
minVersionToUpgrade="1.0" maxVersionToUpgrade="1.9">
</xsf:useTransform>
</xsf:documentversionUpgrade>

These instructions state that the upgrade module 238 is to be applied to versions within a specified range, i.e., between minVersionToUpgrade and maxVersionToUpgrade. In this case, the minVersionToUpgrade is identified as version 1.0, and the maxVersionToUpgrade is specified as version 1.9. Since the user is attempting to render a document (XML-V1) produced by version V1, then the forms application 610 will apply the upgrade module 238 to this version. Step 914 involves displaying the XML-V1 document using the upgrade module 238. Details of step 914 are presented in FIG. 12.

In addition, the forms application 610 provides other techniques for processing the XML-V1 document. For instance, in step 1106, the forms application 610 determines whether the retrieved solution module 204 has been configured to apply a special script to convert the XML-V1 document into a format compatible with the retrieved solution module 204. Such a script can be created by a designing user and stored in the business logic 310 of the solution module 204. The forms application 610 can automatically access and apply the script in response to an editing user's request to edit the XML-V1 input document. Step 1108 represents the application of the custom script to the XML-V1 document.

In another case, as reflected in step 1110, the forms application 610 can apply a custom XSL upgrade module to the inputted document (XML-V1), rather than the upgrade module 238 that was automatically generated by the forms application 610 when the designing user 624 made a change in the electronic form. If this technique is activated, in step 1112, the forms application 610 applies the custom XSL module to the is input document.

In another case, as reflected in step 1114, the forms application 610 can process the XML-V1 document without first transforming this document using any upgrade module. In this case, as reflected in step 1116, the XML-V1 document is displayed as if it was a document created by a later version (e.g., version V2), which is not the case. This might result in one or more anomalies in the visual presentation of the electronic form, and one or more anomalies in the behavior of the thus displayed form.

Finally, step 1118 indicates that the forms application 610 can render the XML-V1 document using still additional techniques. Generally, as was assumed in the above discussion, the forms application 610 can be configured to automatically select any of the options shown in FIG. 11. This can be performed by reading and applying selection preferences specified by the user in advance. In another implementation, the forms application 610 can provide a menu at runtime which identifies the various document processing options available to the editing user 208. This gives the editing user 208 the option of selecting a strategy at that time.

The Operation of the Upgrade Module

FIG. 12 describes a procedure 914 used to render a document using an upgrade module 238. This procedure corresponds to step 914 shown in FIGS. 9 and 11. To provide a concrete example, the procedure 914 will be described in the context of the scenario illustrated in FIGS. 7 and 8. In this scenario, version V1 of the electronic form 702 includes nodes corresponding to First Name and Last name (associated with data entry fields 704 and 706, respectively). The electronic form 702 is modified as shown in FIG. 8 to produce version V2 of the electronic form 804 that contains the additional node related to Age (associated with data entry field 806). In the case shown in FIG. 12, the editing user 208 is seeking to render a document produced by version V1 of the is electronic form 702 (i.e., an XML-V1 document) using version V2 of the solution module 204.

More specifically, the procedure 914 focuses on an exemplary routine 1202 for processing a single leaf node that is expected by version V2 of the solution module 204. As indicated by loop 1204, the routine 1202 is repeated a plurality of times for individual nodes expected by version V2 of the solution module 204. That is, for instance, some of the nodes expected by version V2 include a collection of child nodes associated therewith. Also, these child nodes may have their own respective child nodes. Nodes that have a plurality of nodes associated therewith are referred to as container nodes. The loop 1204 generally indicates that the routine 1202 is repeated for individual nodes within a container.

Generally, routine 1202 processes an XML-V1 document by making reference to the expectations of version V2 of the solution module 204 to produce a modified document. For a single expected node, step 1206 of the routine 1202 creates a corresponding node in the modified document. That is, if the schema of the version V2 of the solution module 204 indicates that a node is expected, then the routine 1202 creates this node. A node that is present in the XML-V1 document that is not expected by the V2 schema is not created, and thus is effectively deleted.

Step 1208 determines whether the node created in step 1206 has a counterpart node in the XML-V1 document. If so, in step 1210, the routine 1202 copies the content of the counterpart XML-V1 node into the node created in step 1206. If step 1208 is answered in the negative, then a step 1212 can add default content to the node created in step 1206. In other words, assume that the XML-V1 document omits a node that is expected by the V2 version. In this case, the routine 1202 will add that node to the modified document in step 1206, and then assign a default value to that node in step 1212.

Once again, the loop 1204 indicates that the routine 1202 is repeated a plurality of times for additional nodes expected by version V2 of the solution module 204.

As a result of the above-described processing, an XML-V1 document can be successfully processed using the XSLT associated with version V2 of the solution module 204. In effect, the upgrade module 238 internally transforms the XML-V1 document into an XML-V2 document. The same procedure can be performed to transform any input document, such as, in one case, an input document that has a completely arbitrary form relative to the schema of the version V2.

In the exemplary context of FIGS. 7 and 8, the upgrade procedure has the effect of adding an age node to the XML-V1 document before it is transformed by the XSLT associated with version V2 of the solution module 204. FIG. 13 illustrates the transformation produced by the upgrade module in this case. In that figure, an input XML-V1 document 1302 is input to a V2 solution module 204. The input document 1302 does not contain a node for Age. In response, the V2 solution module 204 applies the XSL upgrade module 1304. Instructions 1306 in the upgrade module 1304 are specifically responsible for adding an age node to the input XML-V1 document 1302. The upgrade module 1304 has the end effect of producing XML-transformed document 1308. The resultant XML-transformed document 1308 contains an element 1310 pertinent to the added age node. This new node is also assigned the default age of "18," as specified by the upgrade module 1304.

The procedure 914 shown in FIGS. 12 and 13 emphasized the processing of added and deleted nodes. These are changes that are dictated by the schema 304 of version V2 of the solution module 204. However, the upgrade module 238 can also transform input documents so that they satisfy other expectations associated with the electronic form 222 that are not necessarily dictated by its schema 304. These other aspects might pertain to the visual presentation of the electronic form 222 or its editing behavior, and so on.

D. Exemplary Computer Environment

FIG. 14 illustrates one example of a computing environment 1400 within which the above-described forms application 610 can be either fully or partially implemented. The computing environment 1400 includes the general purpose computer 602 and display device 620 discussed in the context of FIG. 6. However, the computing environment 1400 can include other kinds of computer and network architectures. For example, although not shown, the computer environment 1400 can include hand-held or laptop devices, set top boxes, programmable consumer electronics, mainframe computers, gaming consoles, etc. Further, FIG. 14 shows elements of the computer environment 1400 grouped together to facilitate discussion. However, the computing environment 1400 can employ a distributed processing configuration. In a distributed computing environment, computing resources can be physically dispersed throughout the environment.

Exemplary computer 602 includes one or more processors or processing units 604, a system memory 606, and a bus 1402. The bus 1402 connects various system components together. For instance, the bus 1402 connects the processor 604 to the system memory 606. The bus 1402 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 can also include a variety of computer readable media, including a variety of types of volatile and non-volatile media, each of which can be removable or non-removable. For example, system memory 606 includes computer readable media in the form of volatile memory, such as random access memory (RAM) 1404, and non-volatile memory, such as read only memory (ROM) 1406. ROM 1406 includes an input/output system (BIOS) 1408 that contains the basic routines that help to transfer information between elements within computer 602, such as during startup. RAM 1404 typically contains data and/or program modules in a form that can be quickly accessed by processing unit 604.

Other kinds of computer storage media include a hard disk drive 1410 for reading from and writing to a non-removable, non-volatile magnetic media, a magnetic disk drive 1412 for reading from and writing to a removable, non-volatile magnetic disk 1414 (e.g., a "floppy disk"), and an optical disk drive 1416 for reading from and/or writing to a removable, non-volatile optical disk 1418 such as a CD-ROM, DVD-ROM, or other optical media. The hard disk drive 1410, magnetic disk drive 1412, and optical disk drive 1416 are each connected to the system bus 1402 by one or more data media interfaces 1420. Alternatively, the hard disk drive 1410, magnetic disk drive 1412, and optical disk drive 1416 can be connected to the system bus 1402 by a SCSI interface (not shown), or other coupling mechanism. Although not shown, the computer 602 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 602. For instance, the readable media can store the operating system 608, one or more application programs 1422 (such as the forms application 610), other program modules 1424, and program data 1426.

The computer environment 1400 can include a variety of input devices. For instance, the computer environment 1400 includes the keyboard 212 and a pointing device 214 (e.g., a "mouse") for entering commands and information into computer 602. The computer environment 1400 can include other input devices (not illustrated), such as a microphone, joystick, game pad, satellite dish, serial port, scanner, card reading devices, digital or video camera, etc. Input/output interfaces 1428 couple the input devices to the processing unit 604. More generally, input devices can be coupled to the computer 602 through any kind of interface and bus structures, such as a parallel port, serial port, game port, universal serial bus (USB) port, etc.

The computer environment 1400 also includes the display device 620. A video adapter 1430 couples the display device 620 to the bus 1402. In addition to the display device 620, the computer environment 1400 can include other output peripheral devices, such as speakers (not shown), a printer (not shown), etc.

Computer 602 can operate in a networked environment using logical connections to one or more remote computers, such as a remote computing device 1432. The remote computing device 1432 can comprise any kind of computer equipment, including a general purpose personal computer, portable computer, a server, a router, a network computer, a peer device or other common network node, etc. Remote computing device 1432 can include all of the features discussed above with respect to computer 602, or some subset thereof.

Any type of network can be used to couple the computer 602 with remote computing device 1432, such as a local area network (LAN) 1434, or a wide area network (WAN) 1436 (such as the Internet). When implemented in a LAN networking environment, the computer 602 connects to local network 1434 via a network interface or adapter 1438. When implemented in a WAN networking environment, the computer 602 can connect to the WAN 1436 via a modem 1440 or other connection strategy. The modem 1440 can be located internal or external to computer 602, and can be connected to the bus 1402 via serial I/O interfaces 1442 other appropriate coupling mechanism. Although not illustrated, the computing environment 1400 can provide wireless communication functionality for connecting computer 602 with remote computing device 1432 (e.g., via modulated radio signals, modulated infrared signals, etc.).

In a networked environment, the computer 602 can draw from program modules stored in a remote memory storage device 1444. Generally, the depiction of program modules as discrete blocks in FIG. 14 serves only to facilitate discussion; in actuality, the programs modules can be distributed over the computing environment 1400, and this distribution can change in a dynamic fashion as the modules are executed by the processing unit 604.

Wherever physically stored, one or more memory modules 606, 1414, 1418, 1444, etc. can be provided to store the forms application 610.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for upgrading documents for processing by a solution module associated with a markup language schema, comprising:
   creating a structured document using a first version of the solution module;
   inputting the structured document having particular data entry fields associated therewith into a particular version of the solution module, wherein the particular version is different from the first version of the solution module;
   accessing upgrade functionality for:
      determining whether each of the particular data entry fields matches expected data entry fields associated with the particular version of the solution module, wherein the determining further comprises determining whether the input structured document lacks data entry fields that were previously classified as optional but are no longer classified as optional in the particular version of the solution module; and
      modifying the particular data entry fields of the input structured document so that the particular data entry fields match the expected data entry fields to thereby provide a modified structured document that is compatible with the particular version of the solution module, wherein said modifying occurs prior to transforming the modified structured document into a format suitable for visual presentation on a display device.

2. A method according to claim 1, further comprising:
   transforming the modified structured document into another document suitable for presentation;
   displaying the another document suitable for presentation using the particular version of the solution module to provide a displayed document; and receiving edits to the displayed document.

3. The method according to claim 1, wherein the input structured document is expressed in a markup language that uses tags pertaining to subject matter fields in the input structured document.

4. The method according to claim 3, wherein the input structured document is expressed in extensible markup language (XML).

5. The method according to claim 2, wherein the another document suitable for presentation is expressed in a markup language that uses tags pertaining to visual features associated with the presentation of the another document.

6. The method according to claim 5, wherein the another document suitable for presentation is expressed in hypertext markup language (HTML).

7. The method according to claim 1, wherein the modifying uses an upgrade module that provides a transformation function using extensible stylesheet language (XSL).

8. The method according to claim 2, wherein the another document suitable for presentation comprises an electronic form having at least one user data entry field therein.

9. The method according to claim 1, wherein the determining of whether each of the particular data entry fields matches expected data entry fields associated with the particular version of the solution module comprises:
   determining whether the input structured document contains each of the data entry fields expected by the particular version of the solution module.

10. The method according to claim 9, wherein the modifying of the particular data entry fields of the input structured document to produce the modified structured document comprises:
    creating each of the data entry fields expected by the particular version of the solution module to provide created data entry fields;
    copying data entry fields content from the input structured document into corresponding created data entry fields in the modified structured document for those data entry fields in the input structured document that have counterpart data entry fields expected by the particular version of the solution module; and
    creating default data entry fields content in corresponding data entry fields in the modified structured document for those created data entry fields that do not have counterpart data entry fields in the input structured document.

11. The method according to claim 1, wherein the modifying of the particular data entry fields of the input structured document to produce the modified structured document comprises:
    creating new data entry fields in the modified structured document providing that the new data entry fields are lacking in the input structured document and providing that the new data entry fields are required in the particular version of the solution module although considered optional by its schema.

12. The method according to claim 1, wherein the expected data entry fields are specified by a schema associated with the particular version of the solution module.

13. The method according to claim 1, wherein the expected data entry fields are specified by some information other than a schema associated with the particular version of the solution module.

14. The method according to claim 1, wherein the input structured document corresponds to a markup language document generated by an earlier version of the solution module compared to the particular version.

15. The method according to claim 1, wherein the input structured document corresponds to a markup language document generated by a later version of the solution module compared to the particular version.

16. The method according to claim 1, wherein the modifying is performed using an upgrade module, and wherein the upgrade module is developed without knowledge of any requirements of any input structured document.

17. The method according to claim 1, wherein the modifying of the particular data entry fields of the input structured document to produce the modified structured document comprises:
  creating new data entry fields in the modified structured document providing that the new data entry fields are lacking in the input structured document and providing that the new data entry fields are required in the particular version of the solution module.

18. The method according to claim 1, wherein the modifying of the particular data entry fields of the input structured document to produce the modified structured document comprises:
  omitting from the modified structured document existing data entry fields in the input structured document that are not required in the particular version of the solution module.

19. A method for generating an upgrade module for upgrading documents for processing by a solution module associated with a markup language schema, comprising:
  determining whether a particular version of the solution module has been created that warrants generation of the upgrade module;
  when the determination indicates that generation of the upgrade module is warranted, generating the upgrade module;
  configuring the upgrade module to modify an input structured document having particular data entry fields associated therewith to create an updated document which conforms to expected data entry fields associated with the particular version of the solution module;
  modifying the input structured document to create new data entry fields in the updated document provided that the new data entry fields are required in the particular version of the solution module even if the new data entry fields are considered optional by its schema; and
  displaying the updated document on a display device.

20. The method of claim 19, wherein the upgrade module is generated using extensible stylesheet language (XSL).

21. The method according to claim 19, further comprising:
  configuring the upgrade module to modify the particular data entry fields in the input structured document such that the updated document conforms to the expected data entry fields associated with the particular version of the solution module.

22. The method according to claim 19, further comprising:
  configuring the upgrade module to omit data entry fields in the input structured document from the updated document such that the updated document conforms to the expected data entry fields associated with the particular version of the solution module.

* * * * *